(12) United States Patent
Lee et al.

(10) Patent No.: US 12,736,250 B2
(45) Date of Patent: Sep. 15, 2026

(54) AIR CLEANER

(71) Applicant: LG ELECTRONICS INC., Seoul (KR)

(72) Inventors: Kunyoung Lee, Seoul (KR); Juhyup Yoon, Seoul (KR); Bohyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 320 days.

(21) Appl. No.: 18/221,589

(22) Filed: Jul. 13, 2023

(65) Prior Publication Data

US 2024/0019168 A1 Jan. 18, 2024

(30) Foreign Application Priority Data

Jul. 14, 2022 (KR) ........................ 10-2022-0087014

(51) Int. Cl.
*F24F 13/20* (2006.01)
*F24F 8/108* (2021.01)
(Continued)

(52) U.S. Cl.
CPC ................ *F24F 13/20* (2013.01); *F24F 8/80* (2021.01); *F24F 11/52* (2018.01);
(Continued)

(58) Field of Classification Search
CPC .. F24F 8/80; F24F 13/08; F24F 13/081; F24F 13/20; F24F 11/52
See application file for complete search history.

(56) References Cited

U.S. PATENT DOCUMENTS 8,414,670 B2 4/2013 Lee
2008/0028733 A1* 2/2008 Paterson ............ B01D 46/0002 55/471
(Continued)

FOREIGN PATENT DOCUMENTS

CN 101808712 8/2010
CN 104329748 2/2015
(Continued)

OTHER PUBLICATIONS

Polycarbonate Sheet—A/R Abrasion Resistant, Apr. 11, 2004, Professional Plastics https://www.professionalplastics.com/POLYCARBONATEAR?srsltid=AfmBOopBammsa04JOFzYTwyi0BtZ8JrCm8vbCoKm-Fq2pCa1UN2nlNae (Year: 2004).*
(Continued)

*Primary Examiner* — Michael James Giordano
(74) *Attorney, Agent, or Firm* — KED & ASSOCIATES, LLP

(57) ABSTRACT

An air cleaner includes a first body having an inlet, and an outlet; a fan rotatably disposed between the inlet and the outlet to induce air flow from the inlet to the outlet; a filter removing foreign substance in air introduced through the inlet; and a second body disposed above the first body and guiding air discharged from the outlet in a radially outward direction. A lower surface of the second body is disposed above the outlet and extends in the radially outward direction as it goes upward, and wherein an upper surface of the second body that is disposed at a side of the lower surface of the second body and that at least portion thereof forms a flat surface.

18 Claims, 31 Drawing Sheets

(51) Int. Cl.
*F24F 8/80* (2021.01)
*F24F 11/52* (2018.01)
*H02J 50/10* (2016.01)

(52) U.S. Cl.
CPC .......... *B01D 2273/30* (2013.01); *F24F 8/108* (2021.01); *H02J 50/10* (2016.02)

(56) References Cited

U.S. PATENT DOCUMENTS

| | | | | |
|---|---|---|---|---|
| 2011/0037368 | A1 | 2/2011 | Huang | |
| 2015/0108364 | A1 | 4/2015 | Hanai et al. | |
| 2015/0231542 | A1 | 8/2015 | Wennerstrom et al. | |
| 2015/0273376 | A1 | 10/2015 | Sohn et al. | |
| 2017/0122583 | A1 | 5/2017 | Lee et al. | |
| 2017/0248153 | A1 | 8/2017 | Park et al. | |
| 2018/0001248 | A1 | 1/2018 | Jung et al. | |
| 2018/0295986 | A1* | 10/2018 | Dash | A47B 83/04 |
| 2019/0226698 | A1 | 7/2019 | Kim et al. | |
| 2020/0289968 | A1 | 9/2020 | Scholten et al. | |
| 2020/0298160 | A1 | 9/2020 | Jeon et al. | |
| 2020/0298165 | A1 | 9/2020 | Kang et al. | |
| 2021/0207847 | A1 | 7/2021 | Lee et al. | |
| 2021/0387125 | A1 | 12/2021 | Scholten et al. | |
| 2022/0032222 | A1 | 2/2022 | Park et al. | |
| 2022/0154953 | A1 | 5/2022 | Herskovitz et al. | |
| 2022/0184542 | A1 | 6/2022 | Kim et al. | |
| 2022/0184543 | A1 | 6/2022 | Choi et al. | |

FOREIGN PATENT DOCUMENTS

| | | | | |
|---|---|---|---|---|
| CN | 104406235 | | 3/2015 | |
| CN | 105261890 | A * | 1/2016 | |
| CN | 206944336 | | 1/2018 | |
| CN | 206944336 | U * | 1/2018 | |
| CN | 109405123 | | 3/2019 | |
| CN | 210624810 | | 5/2020 | |
| CN | 112013489 | | 12/2020 | |
| CN | 212746822 | | 3/2021 | |
| CN | 113623807 | | 11/2021 | |
| CN | 113465085 | | 12/2021 | |
| CN | 216281900 | | 4/2022 | |
| CN | 216409143 | | 4/2022 | |
| CN | 216409243 | | 4/2022 | |
| CN | 114484709 | | 5/2022 | |
| CN | 114521224 | | 5/2022 | |
| CN | 114526534 | | 5/2022 | |
| CN | 216744764 | | 6/2022 | |
| EP | 3832217 | | 6/2021 | |
| GB | 2286978 | | 9/1995 | |
| JP | 2006-320447 | | 11/2006 | |
| JP | 2007-127909 | | 5/2007 | |
| JP | 2014-202384 | | 10/2014 | |
| JP | 2018-532975 | | 11/2018 | |
| JP | 2022-025054 | | 2/2022 | |
| KR | 10-2016-0025975 | | 3/2016 | |
| KR | 10-1652363 | | 9/2016 | |
| KR | 10-2017-0051276 | | 5/2017 | |
| KR | 10-2017-0131734 | | 11/2017 | |
| KR | 10-2018-0065164 | | 6/2018 | |
| KR | 10-1867084 | | 6/2018 | |
| KR | 10-2019-0119564 | | 10/2019 | |
| KR | 10-2019-0137048 | | 12/2019 | |
| KR | 10-2020-0004167 | | 1/2020 | |
| KR | 10-2139575 | | 7/2020 | |
| KR | 20-2020-0002055 | | 9/2020 | |
| KR | 10-2020-0111895 | | 10/2020 | |
| KR | 10-2021-0105856 | | 8/2021 | |
| KR | 10-2289453 | | 8/2021 | |
| KR | 102289453 | B1 * | 8/2021 | A61L 9/14 |
| KR | 10-2021-0110427 | | 9/2021 | |
| KR | 10-2021-0137720 | | 11/2021 | |
| KR | 10-2021-0140930 | | 11/2021 | |
| KR | 10-2022-007355 | | 1/2022 | |
| KR | 10-2022-0007363 | | 1/2022 | |
| KR | 10-2022-0007993 | | 1/2022 | |
| KR | 10-2022-0018766 | | 2/2022 | |
| KR | 10-2022-0018994 | | 2/2022 | |
| KR | 10-2022-0022038 | | 2/2022 | |
| KR | 10-2022-0059885 | | 5/2022 | |
| KR | 10-2022-0076876 | | 6/2022 | |
| WO | WO 2017/074128 | | 5/2017 | |
| WO | WO 2017/146353 | | 8/2017 | |
| WO | WO 2018/016883 | | 1/2018 | |
| WO | WO 2021/246949 | | 12/2021 | |
| WO | WO 2021/246950 | | 12/2021 | |
| WO | WO-2023046031 | A1 * | 3/2023 | F24F 13/20 |

OTHER PUBLICATIONS

Extended European Search Report dated Nov. 16, 2023 issued in Application No. 23185149.4.
Korean Office Action dated Apr. 16, 2024 issued in Application No. 10-2022-0087019.
Korean Office Action dated Apr. 16, 2024 issued in Application No. 10-2022-0087018.
Korean Office Action dated Apr. 16, 2024 issued in Application No. 10-2022-0087017.
Korean Office Action dated Apr. 16, 2024 issued in Application No. 10-2022-0087016.
Korean Office Action dated Apr. 16, 2024 issued in Application No. 10-2022-0087015.
European Search Report dated Feb. 13, 2024, issued in Application No. 23201527.1.
European Search Report dated Feb. 13, 2024, issued in Application No. 23202298.8.
Korean Office Action dated Apr. 21, 2024, issued in Application No. 10-2022-0128429.
Korean Office Action dated Apr. 21, 2024, issued in Application No. 10-2022-0130152.
Korean Notice of Allowance dated Nov. 27, 2024, issued in Appl. No. 10-2022-0087015.
European Search Report dated Dec. 7, 2023, issued in Application No. 23185186.6.
U.S. Non-Final Office Action dated Feb. 20, 2024 issued in U.S. Appl. No. 18/221,200.
European Search Report dated Dec. 7, 2023, issued in Application No. 23185181.7.
European Search Report dated Dec. 8, 2023, issued in Application No. 23185189.0.
Extended European Search Report dated Dec. 13, 2023, issued in Application No. 23185155.1.
Korean Office Action dated Mar. 19, 2024, issued in Application No. 10-2022-0087012.
Korean Office Action dated Mar. 19, 2024, issued in Application No. 10-2022-0087014.
Korean Notice of Allowance dated Nov. 1, 2024, issued in Application No. 10-2022-0087014.
European Search Report dated Nov. 28, 2023, issued in Application No. 23185161.9.
European Search Report dated Dec. 1, 2023, issued in Application No. 23185203.9.
European Search Report dated Dec. 4, 2023, issued in Application No. 23185183.3.
U.S. Appl. No. 18/221,031, filed Jul. 12, 2023.
U.S. Appl. No. 18/221,067, filed Jul. 12, 2023.
U.S. Appl. No. 18/221,110, filed Jul. 12, 2023.
U.S. Appl. No. 18/221,152, filed Jul. 12, 2023.
U.S. Appl. No. 18/221,200, filed Jul. 12, 2023.
U.S. Appl. No. 18/221,540, filed Jul. 13, 2023.
U.S. Appl. No. 18/221,556, filed Jul. 13, 2023.
U.S. Appl. No. 18/221,576, filed Jul. 13, 2023.
U.S. Appl. No. 18/221,589, filed Jul. 13, 2023.
U.S. Appl. No. 18/377,447, filed Oct. 6, 2023.
U.S. Appl. No. 18/378,256, filed Oct. 10, 2023.
Korean Office Action dated Mar. 22, 2024 issued in Application No. 10-2022-0087011.

(56) References Cited

OTHER PUBLICATIONS

Korean Office Action dated Mar. 22, 2024 issued in Application No. 10-2022-0087010.
https://www.puxiang.com/galleries/e5feb919185826774129a08134c87c7f (dated Nov. 23, 2017).
Chinese Office Action dated May 20, 2026 issued in Application No. 202310856904.3.

* cited by examiner

AIR CLEANER

CROSS-REFERENCE TO RELATED APPLICATION

This application claims priority under 35 U.S.C. § 119 to Korean Application No. 10-2022-0087014, filed in Korea on Jul. 14, 2022, whose entire disclosure is hereby incorporated by reference.

BACKGROUND

1. Field

Embodiments may relate to an air cleaner, and more specifically to an air cleaner capable of utilizing a space above the air cleaner.

2. Background

The air cleaner is a device that forms an air flow and that increases an air clearness of air in a certain space after filtering the flowing air. The air cleaner may have a filter, and that an inlet is formed at one side thereof and an outlet is formed at the other side thereof. The air cleaner may form the outlet at an upper side thereof and may discharge the filtered air all around to quickly increase the air clearness of an indoor space.

The Gazette KR 10-2021-0137720, the subject matter of which is incorporated herein by reference, discloses a structure in which a fan is disposed above an air cleaner that forms an upward air flow. Since a device changing direction of air is disposed above the outlet which is opened in up-down direction, it may be difficult to utilize a space above the air cleaner. In the above structure, since a structure is disclosed in which a fan changing direction of air is fixed to an upper part of the air cleaner forming the upward air flow, is disclosed, it may be difficult to modify an upper structure.

BRIEF DESCRIPTION OF THE DRAWINGS

Embodiments may be described in detail with reference to the following drawings in which like reference numerals refer to like elements, and wherein.

DETAILED DESCRIPTION

Advantages and features of embodiments, and methods of achieving them will become clear with reference to the detailed description of the following embodiments taken in conjunction with the accompanying drawings. However, embodiments are not limited to the embodiments disclosed below and can be implemented in various forms, these embodiments are provided only to make the disclosure of the present invention complete, and to fully inform those skilled in the art of the scope of the invention to which the present invention belongs, the present invention is only defined by the scope of the claims.

Figure 1:
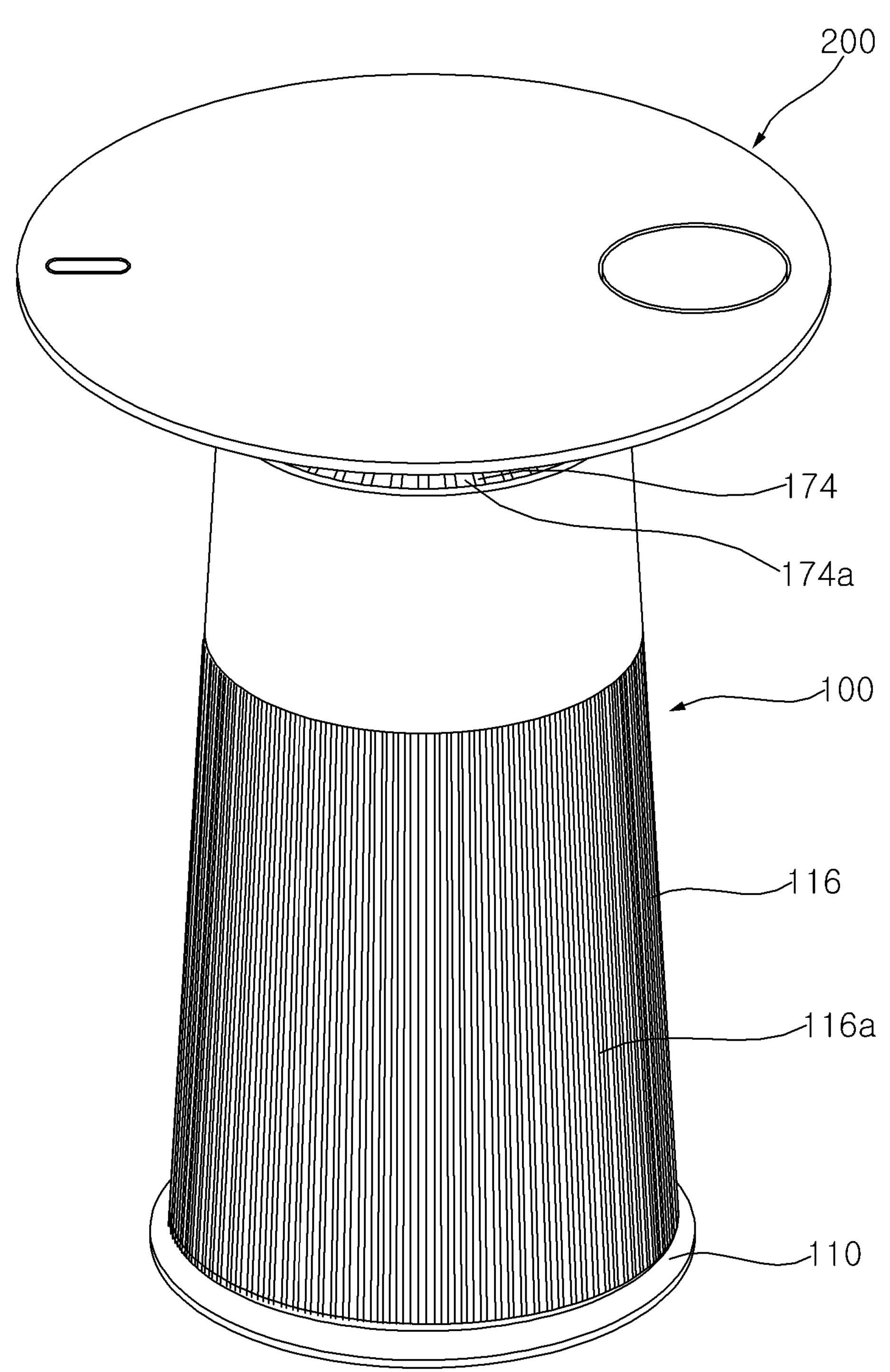
FIG. 1 shows a perspective view of an air cleaner according to a first embodiment.
Figure 2:
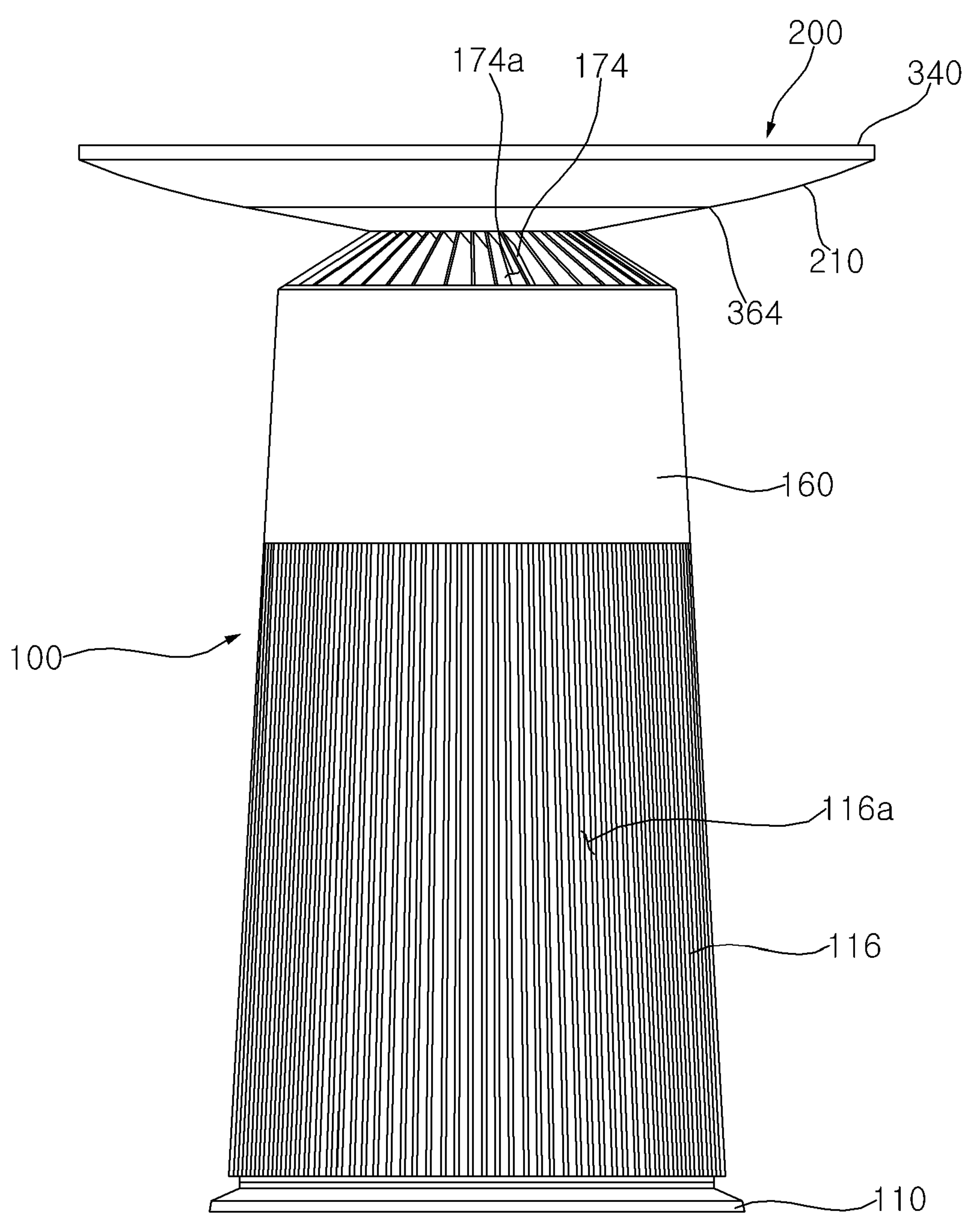
FIG. 2 shows a side view of FIG. 1.
Figure 3:
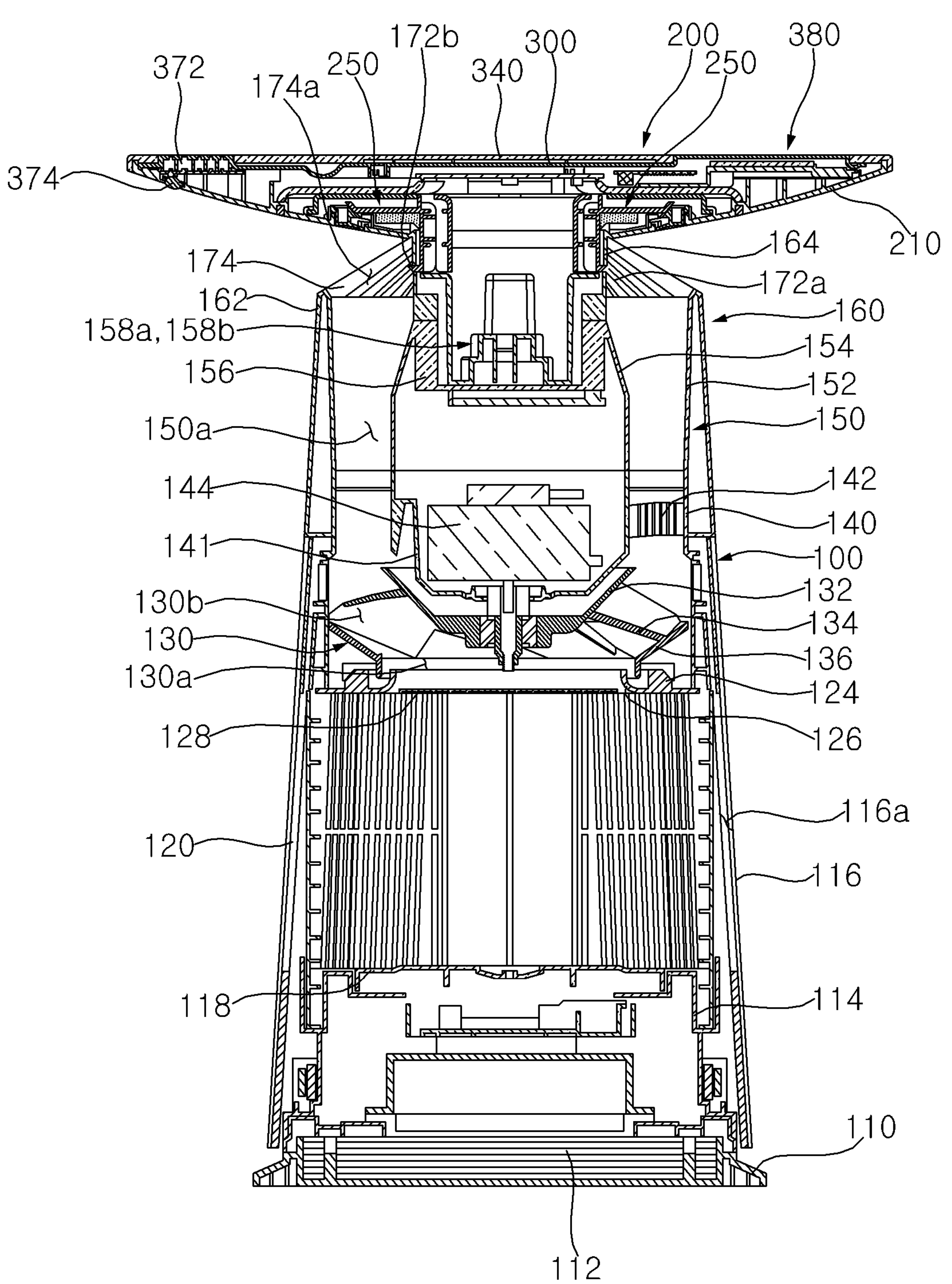
FIG. 3 shows a sectional view of the air cleaner according to the first embodiment.

Referring to FIGS. 1 to 3, an air cleaner may include a first body 100 having an inlet 116*a* at a peripheral surface of the first body 100 and an outlet 174*a* at an upper surface of the first body, and a second body 200 disposed above the first body 100 and guiding air discharged from the outlet 174*a* in a radially outward direction (or outward directions).

Referring to FIG. 3, the air cleaner may include a base 110 disposed under the first body 100 and contacting the ground. A loading part 112 having an increasing weight may be disposed at a lower portion of the first body 100 to prevent overturn of the air cleaner. The loading part 112 may disposed such that a plurality of plates overlap.

The first body 100 may include a lower housing 114 that is disposed above the base 110 and that forms a space therein accommodating a printed circuit board that controls electronical operation of the air cleaner. The lower housing 114 may be disposed above the base 110. The space in which the printed circuit board is disposed may be formed between the lower housing 114 and the base 110.

A filter mount plate 118 may be disposed at an upper surface of the lower housing 114. The filter mount plate 118 may be disposed at a central portion of the lower housing 114. The filter mount plate 118 may disposed at the lower housing 114 to be movable in up-down direction. An elastic member that maintains a position of the elastic member may be disposed between the filter mount plate 118 and the lower housing 114. Therefore, the filter mount plate 118 may protrude upwardly by the elastic member when a filter is not disposed on the filter mount plate 118.

The filter mount plate 118 moves downward when the filter is mounted thereon. The filter mount plate 118 may sense whether the filter is mounted according to a change of disposition in up-down direction.

The air cleaner may include the filter that filters air entering the inlet 116*a*. The filter may have a cylindrical shape and be disposed inside an inlet grille 116. Therefore, it is possible to filter air flowing upward through the inlet 116*a*.

The first body 100 may include an inner suction panel 124 spaced upward from the filter mount plate 118 or the lower housing 114, and configured to form an orifice 126, and may include a supporter 120 that connects the lower housing 114 and the inner suction panel 124.

A plurality of supporters 120 may be disposed along a circumferential direction. The filter may enter through a space between the plurality of supporters 120.

The inner suction panel 124 may form a space therebetween in which the filter is disposed by being spaced upward from the filter mount plate 118 or the lower housing 114. The filter may be disposed between the inner suction panel 124 and the lower housing 114. The filter may have a cylindrical shape and may filter foreign substances in air passing through a peripheral surface of the filter. The filter may be disposed between the inner suction panel 124 and the lower housing 114.

The filter may downwardly pressurize the filter mount plate 118 when the filter is disposed between the inner suction panel 124 and the lower housing 114. Since the elastic member upwardly pressurize the filter, a disposition of the filter may be fixed when the filter is disposed between the inner suction panel 124 and the lower housing 114.

The orifice 126, through which air flows to a fan 130 may be formed at a central portion of the inner suction panel 124. The orifice 126 may guide flowing air passing through the filter to the fan 130. A blocking screen 128 (or other device) may be disposed at the orifice 126. The blocking screen 128 may prevent a body of the user from entering a space in which the fan is disposed.

The inlet grille 116 may be disposed at an outer periphery of the filter. A plurality of inlets 116*a* may be formed at the inlet grille 116. The inlet grille 116 may be disposed to cover the outer periphery of the filter, and/or an outer periphery of the lower housing 114. The inlet grille 116 may be disposed to cover an outer periphery of the fan housing 140. The inlet(s) 116*a* formed at the inlet grille 116 may be formed at a peripheral surface of a region that the filter is disposed.

The air cleaner may include the fan 130 rotatably disposed inside the first body 100 and may include a fan motor 144 for rotating the fan 130. The first body 100 may include a fan housing 140 located above the filter and forming a space in which the fan 130 is disposed.

The fan 130 that is disposed above the inner suction panel 124 and that blows air introduced through the orifice 126 in an upward manner, and the fan motor 144 that is disposed above the fan housing 140 and driving the fan 130 may be disposed in the first body 100.

The fan 130 may have a structure of an oblique-flow fan having a fan suction hole 130*a* that is opened in a downward manner and forming a fan discharging hole 130*b* that is opened upwardly and outwardly. The fan 130 may include a hub 132 connected to the fan motor 144, a shroud 136 spaced apart from the hub 132 and forming the fan suction hole 130*a*, and a plurality of blades 134 spaced apart in a circumferential direction. The fan discharging hole 130*b* may be formed between the hub 132 and the shroud 136. The plurality of blades 134 may induce air flow from the fan suction hole 130*a*.

The fan housing 140 may disposed above the inner suction panel 124. The fan housing 140 may form a space in which the fan 130 is disposed. The fan housing 140 may form a space that is above the fan 130 and in which the fan motor 144 is disposed. The fan housing 140 may form a flow path guiding air blown by the fan 130 upwardly.

The fan housing 140 may have a cylindrical shape that is opened in up-down direction. A motor cover 141 may be disposed at a central portion of the fan housing 140 in which the fan motor 144 is disposed. The motor cover 141 may have a bowl shape that is depressed downwardly such that the fan motor 144 is disposed.

The fan housing 140 may include a guide vane 142 disposed above the space in which the fan 130 is disposed and for reducing vorticity of air discharged from the fan 130. The guide vane 142 may be disposed to connect an inner circumferential surface of the fan housing 140 and an outer circumferential surface of the motor cover 141. A plurality of guide vanes 142 may be spaced apart in a circumferential direction.

The first body 100 may include a discharge guider 150 that upwardly guides air flowing upward from the fan housing 140. The discharge guider 150 may be disposed above the fan housing 140 and may form an annular flow path 140*a* therein.

The discharge guider 150 may include an outer guider 152 that has a cylindrical shape and that extends in an up-down direction, and an inner guider 154 that is disposed radially inward from the outer guider 152 and that extends in an up-down direction.

An upward flow path that has an annular shape may be formed between the outer guider 152 and the inner guider 154. The outer guider 152 may extend from an outer peripheral surface of the fan housing 140. The inner guider 154 may extend upwardly from the motor cover 141.

A connection cover 156 in which an insertion pole 212 of the second body 200 is inserted may be disposed at an upper portion of the inner guider 154. The connection cover 156 may form a space for insertion of the insertion pole 212 by being depressed downwardly. Connection terminals 158*a*, 158*b* that are coupled to corresponding pole terminals 214*a*, 214*b* of the insertion pole 212 may be disposed at a lower portion of the connection cover 156.

The connection terminals 158*a*, 158*b* may include a signal terminal that transmits signal(s) and a power terminal that provides power. The connection terminals may include a first connection terminal 158*a* that provides power and a second connection terminal 158*b* that transmits signal(s).

The first body 100 may include an upper housing 160 that forms the outlet(s) 174*a* through which air flowing upward of the discharge guider 150 is discharged.

The upper housing 160 may be disposed to cover a periphery of the discharge guider 150. The upper housing 160 may have a structure that extends upwardly from the inlet grille 116.

The upper housing 160 may include an outer cover 162 that extends upwardly from the inlet grille and an inner cover 164 that is disposed radially inward of the outer cover 162 and that extends upward of the inlet grille 116 and an outlet grille 174 that connects the inner cover 164 and an upper end portion of the outer cover 162.

The outer cover 162 may be disposed to cover a periphery of the discharge guider 150. The outer cover 162 may be disposed to extend upward from the inlet grille 116.

The inner cover 164 may guide such that the insertion pole 212 is inserted into the connection cover 156. The inner cover 164 may has a structure that extends upwardly from the connection cover 156. The inner cover 164 may have a substantially cylindrical shape such that the insertion pole 212 may be disposed inside the inner cover 164.

Figure 4:
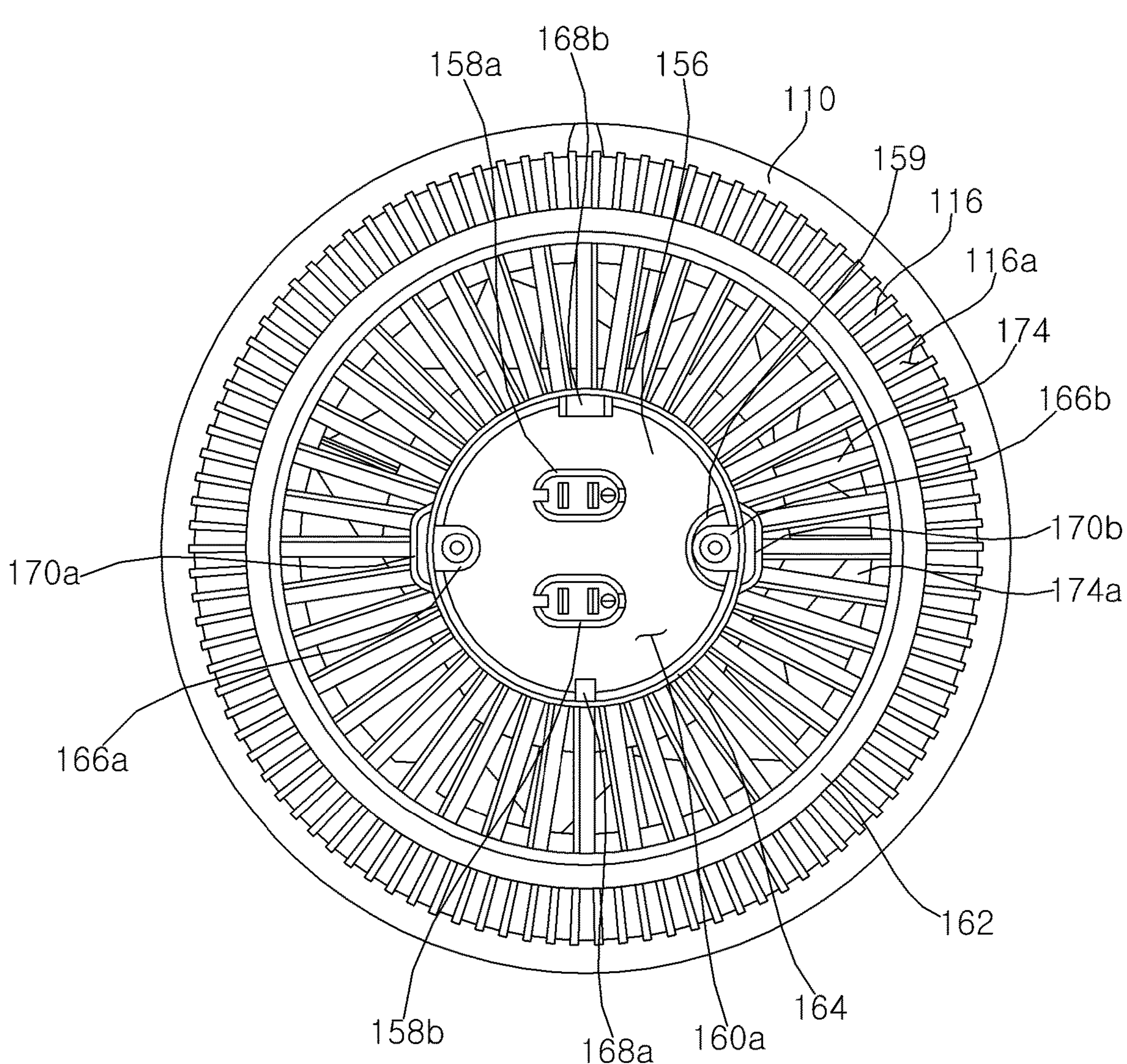
FIG. 4 shows a plan view of a lower body according to the first embodiment.
Figure 5:
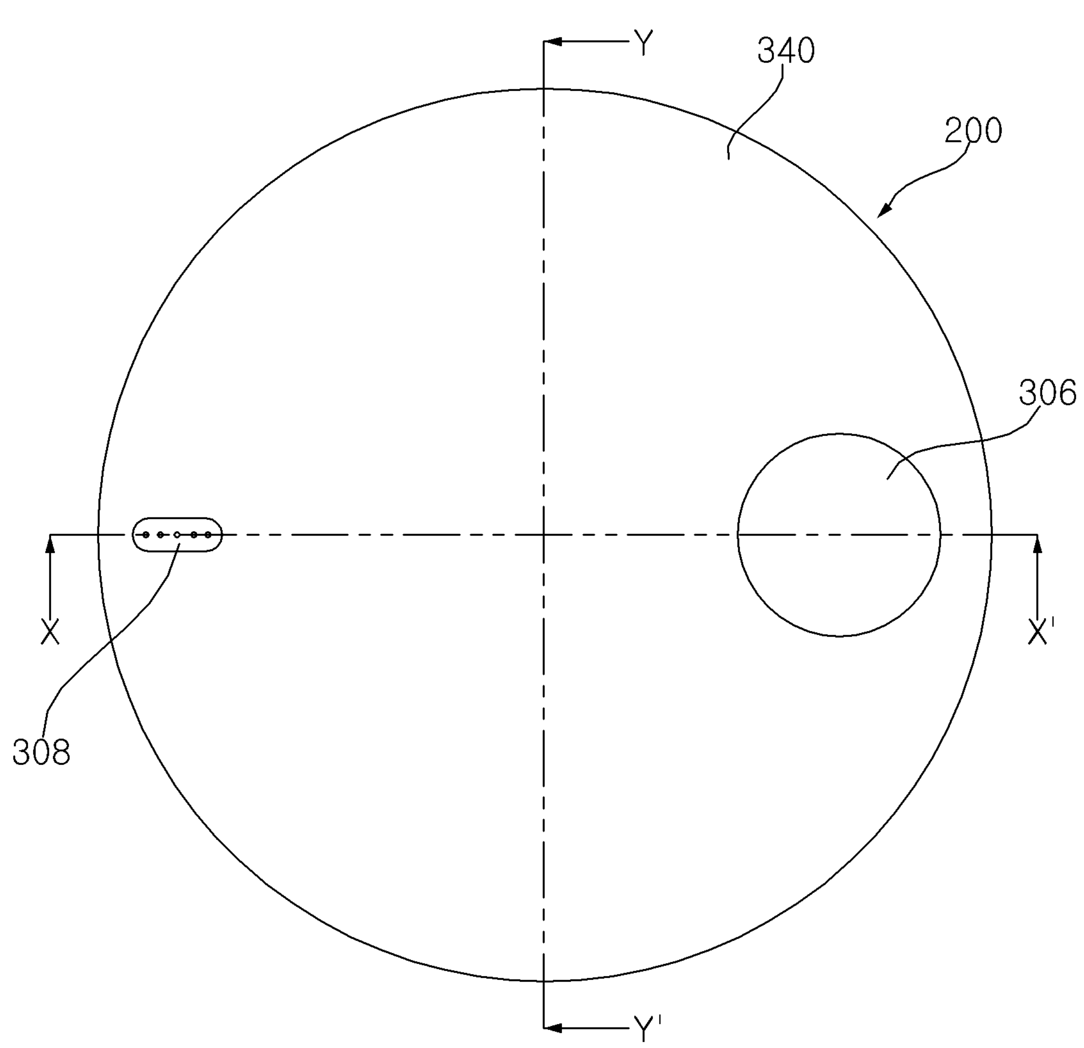
FIG. 5 shows a plan view of an upper body according to the first embodiment.

Fastening ribs 166*a*, 166*b* that are coupled to the connection cover 156 may be disposed at an inner peripheral surface of the inner cover 164. Referring to FIG. 4, two fastening ribs 166*a*, 166*b*, disposed at opposite sides (or in opposite directions to each other) may be disposed at the inner peripheral surface of the inner cover 164. The two fastening ribs 166*a*, 166*b* may be disposed to face each other, respectively, and may be of the same size.

Fastening holes 172*a*, 172*b* in which a hook 252 disposed at the second body 200 is inserted may be formed at an inner peripheral surface of the inner cover 164. The fastening holes 172*a*, 172*b* may be a pair of fastening holes disposed at opposite sides or in opposite directions to each other. Each of the pair of fastening holes 172*a*, 172*b* may be disposed above each of the two fastening ribs 166*a*, 166*b*.

Upper grooves 170*a*, 170*b* that guide the hook 252 to the fastening holes 172*a*, 172*b* may be disposed at an inner peripheral surface of the inner cover 164. The upper grooves 170*a*, 170*b* may formed above the fastening holes 172*a*, 172*b*. The fastening holes 172*a*, 172*b* may be spaced downward from an upper end portion of the inner cover 164.

Two guide ribs 168*a*, 168*b*, for mounting the second body 200 to a same location, may be disposed at an inner peripheral surface of the inner cover 164. The two guide ribs 168*a*, 168*b* may be disposed at opposite sides or in opposite direction to each other. Sizes of the two guide ribs 168*a*, 168*b* may be different.

The outlet grille 174 may have a structure that extends from an upper end of the inner cover 164 toward the outer cover 162. Referring to FIG. 3, the upper end of the inner cover 164 may be higher than an upper end of the outer cover 162. The upper housing 160 may include a plurality of outlet grilles 174 (or outlet grille or outlets) that are spaced apart in a circumferential direction at an upper portion of the inner cover 164.

Each of the plurality of outlet grilles 174 (or outlet grill or outlets) may have a shape in which an inclination angle at an inner end thereof is different than an inclination angle at an outer end thereof. In this example, the inner end of the outlet grille 174 may be a contacting portion of the outlet grille 174 and the inner cover 164. The outer end of the outlet grille 174 may be a contacting portion of the outlet grille 174 and the outer cover 162. In this example, an inclination angle may mean an intersection angle of a line or a plane parallel to the ground and a plane formed by the outlet grille 174. The outlet grille 174 may reduce vorticity of air discharged from the fan 130.

The first body may include a coupling groove 160*a* depressed downward and located inward of the annular outlet 174*a*. The coupling groove 160*a* may be formed at an inside of the inner cover 164 that is formed at the upper housing 160. The coupling groove 160*a* may be formed inside of the inner guider 154 (of the discharge guider 150). The connection terminal 158*a*, 158*b* coupled to the connection cover 156 may be disposed at the coupling groove 160*a*.

The coupling groove 160a may be a region in which the insertion pole 212 (of the second body 200) is inserted and may span to the upper housing 160.

Therefore, a structure formed on an inner surface of the inner cover 164 and a structure formed on an inner circumferential surface of the inner guider 154 may be included at the coupling groove 160*a*.

FIGS. 4 to 19 relate to the second body 200 of the air cleaner according to one embodiment.

A lower surface of the second body 200 may guide air flowing upward through the outlet 174*a* (or outlets or outlet grille) in a radially outward direction (or outward direction). An upper surface of the second body 200, that includes at least a flat plane, may be used as a table. An area formed by the upper surface of the second body 200 may be larger than an area formed by the outlet 174*a*. When viewed from the top, the outlet 174*a* formed at the first body 100 may have a structure hidden by the upper surface of the second body 200. Therefore, liquid or stuff on the upper surface of the second body 200 may be prevented from falling and entering into the outlet 174*a*.

The second body 200 may include a lower cover 210 that guides air discharged from the outlet 174*a* of the first body 100 in a radially outward direction, an upper cover 300 disposed on the lower cover 210, and a top cover 340 disposed on the upper cover 300.

The second body 200 may further include a coupling portion 250 (or coupler) fixing the second body 200 to an upper side of the first body 100. The coupling portion 250 may have a structure that protrudes outward from a peripheral surface of the insertion pole 212 to attach the second body 200 when the insertion pole 212 (of the second body 200) is disposed in the coupling groove 160*a* (of the first body 100).

The upper surface of the second body 200 may be formed of abrasion-resistant PC material. Therefore, the upper surface of the second body 200 may be formed of a material that does not abraded by stuff thereon. The upper surface of the second body 200 may be formed of heat-resistant PC material. It is possible to minimize deformation thereof even if a hot object is placed on the upper surface of the second body 200.

The lower cover 210 may be disposed to attach to the first body 100, and may guide air discharged from the outlet 174*a* of the first body 100 in a radially outward direction (or outward direction). The lower cover 210 may have a bowl shape in which electronic units are disposed. The electronic unit may mean a device which is electrically operable. In this embodiment, the electronic unit may include a charging unit 380 (or charger), a first lamp 362 and a second lamp 372.

The lower cover 210 may include the insertion pole 212 which is inserted into the connection cover 156 of the first body 100, and a guide wall 230 that is disposed above the outlet grille 174 and in which a diameter thereof expand as it goes upwardly.

The insertion pole 212 may include a peripheral wall 216 that is inserted into the connection cover 156, and a lower wall 214 disposed at a lower end portion of the peripheral wall 216.

The corresponding pole terminals 214*a*, 214*b* corresponding to the connection terminals 158*a*, 158*b* may be disposed at the lower wall 214. The corresponding pole terminals 214*a*, 214*b* may include a pole terminal for receiving power and a pole terminal for receiving signal(s).

Each of two corresponding pole terminals 214*a*, 214*b* may be connected to each of two connection terminals 158*a*, 158*b*. The two corresponding pole terminals may include a first pole terminal 214*a* connected to the first connection terminal 158*a* and a second pole terminal 214*b* connected to the second connection terminal 158*b*. The first connection terminal 158*a* may be connected to the first pole terminal 214*a*, and the second connection terminal 158*b* may be connected to the second pole terminal 214*b*.

The corresponding pole terminal(s) 214*a*, 214*b* may be connected to the connection terminal(s) 158*a*, 158*b* when the second body 200 is mounted on the first body 100.

Fastening rib groove(s) 218*a*, 218*b*, in which the fastening rib is inserted, may be formed at the peripheral wall 216 when the second body 200 is mounted on the first body 100. The two fastening rib grooves 218*a*, 218*b* may be formed at the peripheral wall 216. The two fastening rib grooves 218*a*, 218*b* may be disposed in opposite directions to each other (i.e., at opposite sides).

Guide grooves 220*a*, 220*b*, in which a guide rib 168*a*, 168*b* is inserted, may be formed at the peripheral wall 216, when the second body 200 is mounted on the first body 100. The two guide grooves 220*a*, 220*b* having different sizes may be formed at the peripheral wall 216. Each of the two guide grooves 220*a*, 220*b* may have a shape corresponding to each of two guide ribs 168*a*, 168*b* having different sizes and may be disposed a location corresponding to each of the two guide ribs 168*a*, 168*b*.

Since each of two guide ribs 168*a*, 168*b* having different sizes is inserted into corresponding two guide grooves 220*a*, 220*b*, the coupling position between the first body 100 and the second body 200 may be unchanged. Therefore, the first connection terminal 158*a* and the second connection terminal 158*b* may be connected to the first pole terminal 214*a* and the second pole terminal 214*b*, respectively.

A hook hole 222, in which the hook 252 of the coupling portion 250 penetrates, may be formed at the peripheral wall 216. The hook hole 222 may be disposed above each of the coupling rib groove(s) 218*a*, 218*b*.

An edge groove 224 of an upper end portion of the inner cover 164 of the upper housing 160 may be formed at an upper end portion of the insertion pole 212. The edge groove 224 may form a groove, facing the guide wall 230, at the upper end portion of the insertion pole 212.

The guide wall 230 may be disposed above the outlet 174*a*, and may have a shape that extends upward of the outlet 174*a*. The guide wall 230 may have a shape in which a diameter thereof expands as it goes upwardly.

Figure 6:
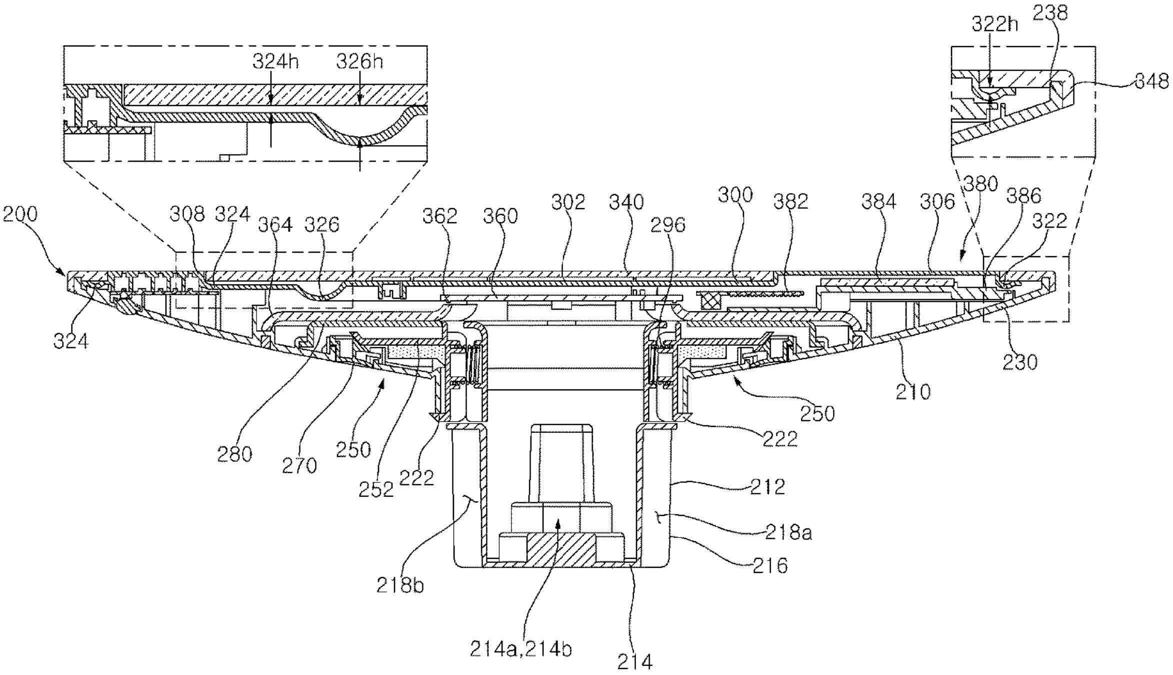
FIG. 6 shows a sectional view cut along line X-X' in FIG. 5.

Referring to FIG. 6, the guide wall 230 may have a shape in which an inclination angle thereof increases as it goes upward from a lower end portion thereof. In this example, the inclination angle may mean an intersection angle between a plane parallel to the ground and the guide wall 230.

A lower end portion of the guide wall 230 may extend from an upper end portion of the inner cover 164. An upper end portion of the guide wall 230 may be larger than a diameter of an peripheral surface formed by the outer cover 162.

A hook button hole 232, in which the hook 270 of the coupling portion 250 is disposed, may be formed at the guide wall 230. A lighting hole 234, through which a part of a light source guide 364 is exposed, may be formed at the guide wall 230. The lighting hole 234 may be formed in a ring shape. The lighting hole 234 may be divided into a plurality of portions by a supporting rib 235 that supports the light source guide 364.

A main button hole 236, in which a button 374 is disposed, may be formed at the guide wall 230. The main button hole 236 may be formed in a number corresponding to a number of buttons 374 disposed thereon. The main button hole 236 may have a shape corresponding to a shape button 374 disposed thereon.

The lower cover 210 may include a plurality of ribs that protrude upwardly from an upper surface of the guide wall 230.

The lower cover 210 may include an edge rib 238 that protrudes upwardly from an upper end of the guide wall 230. Referring to FIG. 6, the edge rib 238 may be disposed inside of a boundary wall 348 of the top cover 340. The edge rib 238 may be disposed outward of an outer periphery of a plate edge 304 of the upper cover 300.

The lower cover 210 may include a plurality of partition ribs 240, 242 that extend upward from an upper surface thereof and that divide a space above the lower cover 210. The plurality of partition ribs 240, 242 may have a concentric circle structure having different radii. The plurality of partition ribs 240, 242 may have structure that extends radially.

The plurality of partition ribs 240, 242 may include a first partition rib 242*a* that is disposed to face the edge rib 238.

The plurality of partition ribs 240, 242 may include a plurality of radial ribs 240 that extend from a lower end portion of an upper surface of the guide wall 230 in a radially outward direction and a plurality of circumferential ribs 242 that have different radii and are disposed at an upper surface of the guide wall 230 and formed to have a ring shape. The plurality of circumferential ribs 242 may have the same center. The plurality of circumferential ribs 242 may have a same concentric center of the edge rib 238.

The plurality of circumferential ribs 242 may have different radii and may divide a space above the lower cover 210 by protruding upwardly from the guide wall 230. Therefore, even if water from the upper cover 300 enters thereinto, the water may be prevented from entering inside of the lower cover 210.

The plurality of circumferential ribs 242 may include a first circumferential rib 242*a* adjacent to the edge rib 238. The first circumferential rib 242*a* may be disposed to face the edge rib 238.

The coupling portion 250 (or coupler) may couple the second body 200 to the first body 100, or may decouple the second body 200 from the first body 100.

The coupling portion 250 may include a hook 252 movably disposed inside the lower cover 210, and the hook button 270 that changes disposition of the hook 252.

The coupling portion 250 may include a hook guider 280 disposed inside the lower cover 210 for guiding the hook 252, and an elastic member 296 disposed between the hook guider 280 and the hook 252.

The hook 252 may include a first moving body 254 that contacts the hook button 270 and that moves in conjunction with movement of the hook button 270, a second moving body 262 that is bent downward from one side of the first moving body 254, and an insertion protrusion 266 that is bent from an end portion of the second moving body 262 and is disposed to protrude outwardly.

The first moving body 254 may form an upper wall of the hook 252 by contacting the hook button 270. The first moving body 254 may do a linear reciprocating motion in a radial direction along a space formed by the hook guider 280.

In this example, the radial direction in which the first moving body 254 moves may be set with respect to a center of the circle shown when viewed from the top.

The first moving body 254 may move in the radial direction inside the lower cover 210 by contacting with the hook button 270. The first moving body 254 may include a button contacting portion 258 that contacts with the hook button 270. The button contacting portion 258 may form an inclined surface to move in the radial direction when the hook button 270 moves in the up-down direction.

The first moving body 254 may extend in a direction perpendicular to a direction of movement of the first moving body 254 and may include a guide protrusion 256 that is disposed above an inner protrusion 288 of the hook guider 280.

The first moving body 254 may protrude upwardly and may be disposed at a moving guide groove 290 of the hook guider 280 and may include an upper protrusion 260 that restricts a movement range of the first moving body 254.

The lower surface of the hook button 270 may form a continuous surface to the guide wall 230. That is, it is possible to maintain streamline of air flowing along the guide wall 230.

The hook button 270 may include a press plate 272 disposed to be exposed to the hook button hole 232 (of the lower cover 210) and a hook contacting portion 274 disposed above the press plate 272 and contacting the button contacting portion 258. The hook contacting portion 274 may form an inclined surface and may be disposed to contact with the button contacting portion 258.

The hook guider 280 may be fixed to an inside of the lower cover 210. The hook guider 280 may guide a radial reciprocation movement of the hook 252. The hook guider 280 may include an upper wall 282 that guides movement of the hook 252 and an end wall 292 that extends downward from an end portion of the upper wall 282.

A fixing protrusion 284 that protrudes in an opposite direction to the end wall 292 may be disposed at the upper wall 282. Since the fixing protrusion 284 protrudes from the upper wall 282, the fixing protrusion 284 may fix the hook guider 280.

A coupling protrusion 286 spaced apart from the fixing protrusion 284 and that couples the hook guider 280 to the lower cover 210 may be disposed at the upper wall 282. The coupling protrusion 286 may be coupled to the lower cover 210 by a fastener.

The moving guide groove in which the upper protrusion 260 of the hook 252 is disposed and that restricts a movement range of the hook 252 may be formed at the upper wall 282.

The inner protrusion 288 protruding downward and restricting upward movement of the hook 252 may be disposed at a lower surface of the upper wall 282. The inner protrusion 288 may be disposed to extend along a movement direction of the hook 252.

The end wall 292 may be perpendicular to the upper wall 282. The elastic member 296 that maintains a disposition of the hook 252 may be disposed between the end wall 292 and the hook 252. A first elastic member fixing portion 264 that fixes one end of the elastic member 296 may be disposed at the second moving body 262. A second elastic member fixing portion 294 that fixes the other end of the elastic member 296 may be disposed at the end wall 292.

As shown in FIG. 6, the elastic member 296 may push the hook 252 radially outward when the user does not apply force to the hook button 270. The hook button 270 may be disposed to be exposed through the hook button hole 232 when the user does not apply force to the hook button 270.

The insertion protrusion 266 of the hook 252 may protrude outward by passing through the hook button hole 222 of the lower cover 210 when the user does not apply force to the hook button 270.

A plurality of first lamps 362, a first board 360 that operates the plurality of first lamps 362, and the light source guide 364 that guides light emitted from the first lamp 362 to a lower side of the lower cover 210 may be disposed above the lower cover 210.

One end portion of the light source guide 364 may be disposed below the first lamp 362. The other end portion of the light source guide 364 may be disposed at the lighting hole 234 formed on the guide wall 230.

A plurality of second lamps 372 that display operation state of the air cleaner and a second board 370 that operates the plurality of second lamps 372 may be disposed above the lower cover 210.

The second board may a substantially rectangular plate shape. The plurality of second lamps 372 may be disposed at an upper surface of the second board 370. The plurality of second lamps may be disposed at the upper surface of the second board 370 to be spaced apart in a circumferential direction.

The button 374 that controls operation or power of the air cleaner may be disposed below the second board 370. The button 374 may be disposed at the main button hole 236 of the lower cover 210. The button 374 may include a plurality of button portions. The plurality of button portions included in the button 374 may have different sizes. The plurality of button portions included in the button 374 may protrude in different directions with respect to the lower cover 210.

The charging unit 380 (or charging device) may be disposed above the lower cover 210. The charging unit 380 may charge an electronic device disposed above the upper cover 300 or the top cover 340.

The charging unit 380 may supply power, using magnetic induction or magnetic resonance method, to the electronic device (or electronic unit) disposed above the upper cover 300 or the top cover 340.

The charging unit 380 may include a charging pad 384 that supplies power to electronic device adjacent thereto, a third board 382 that controls operation of the charging pad 384, an inner plate 386 that attaches the charging pad 384 and the third board 382.

The inner plate 386 may be disposed above the light source guide 364. The inner plate 386 may be fixed to the light source guide 364 or the lower cover 210.

A board fixing portion 390 in which the third board 382 is fixed, and a pad fixing portion 392 may be disposed at the inner plate 386. The pad fixing portion 392 may form a groove into which the charging pad 384 is inserted.

The upper cover 300 may be disposed to cover an upper part of the lower cover 210. The upper cover may cover electronic units (or electronic devices) disposed inside the lower cover 210.

The upper cover 300 may have a substantially disc shape. The upper cover 300 may have a shape corresponding to an upper surface of the lower cover 210.

The upper cover 300 may include a plate 302, and at least one protruding cover 306, 308 protruding upwardly from the plate 302. The upper cover 300 may include a plurality of protruding covers 306, 308 disposed at the plate 302 and spaced apart to each other.

The upper cover 300 may include the plate 302 that has a disc shape, a plate edge 304 that is bent downward from an outer periphery of the plate 302, a first protruding cover 306 that is spaced upward from the plate 302 and that covers an upper side of the charging pad 384 of the charging unit 380, a second protruding cover 308 that covers an upper side of the second lamp 372. A groove(s) 322, 324 depressed downward from a periphery of the protruding cover(s) 306, 308 may be formed at the plate 302.

The plate 302 may have a substantially disc shape. The plate 302 may be disposed to cover an upper side of the lower cover 210. A diameter of the plate 302 may be smaller than a diameter of an upper end portion of the lower cover 210. The plate edge 304 may have a structure that is bent downward from an outer periphery of the plate 302. The diameter of the plate 302 may be larger than a diameter formed by the first circumferential rib 242*a*. Therefore, fluid flowing downward from the plate 302 may flow outside the first circumferential rib 242*a*.

A first groove 322 depressed downward from an outer periphery of the second protruding cover 308, and a second groove 324 depressed downward from an outer periphery of the first protruding cover 306 may be formed at the plate 302.

A connection groove 326 that is disposed between the second protruding cover 308 and the first protruding cover 306 and which is depressed downward may be formed at the plate 302. The connection groove 326 which is connected to the plurality of grooves 322, 324 and which is depressed downward may be formed at the plate 302. The connection groove 326 may be formed inside the plurality of grooves 322, 324 in a ring shape.

Figure 15:
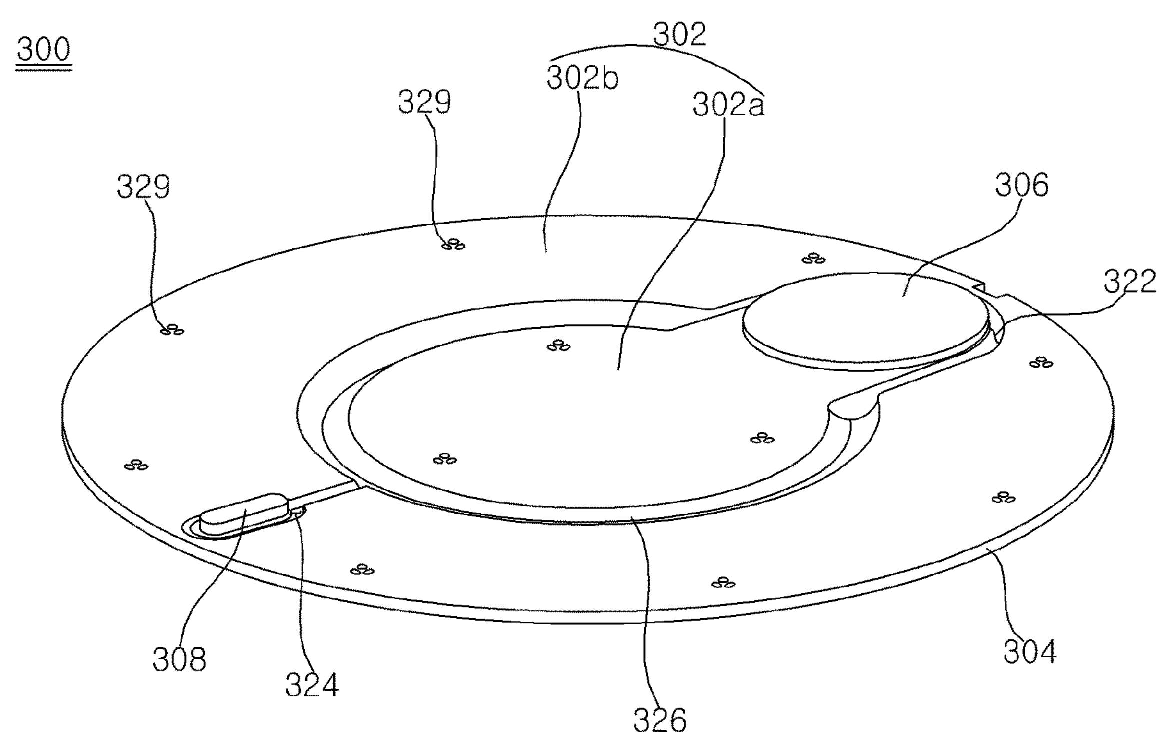
FIG. 15 shows a perspective view of a upper cover according to the first embodiment.
Figure 16:
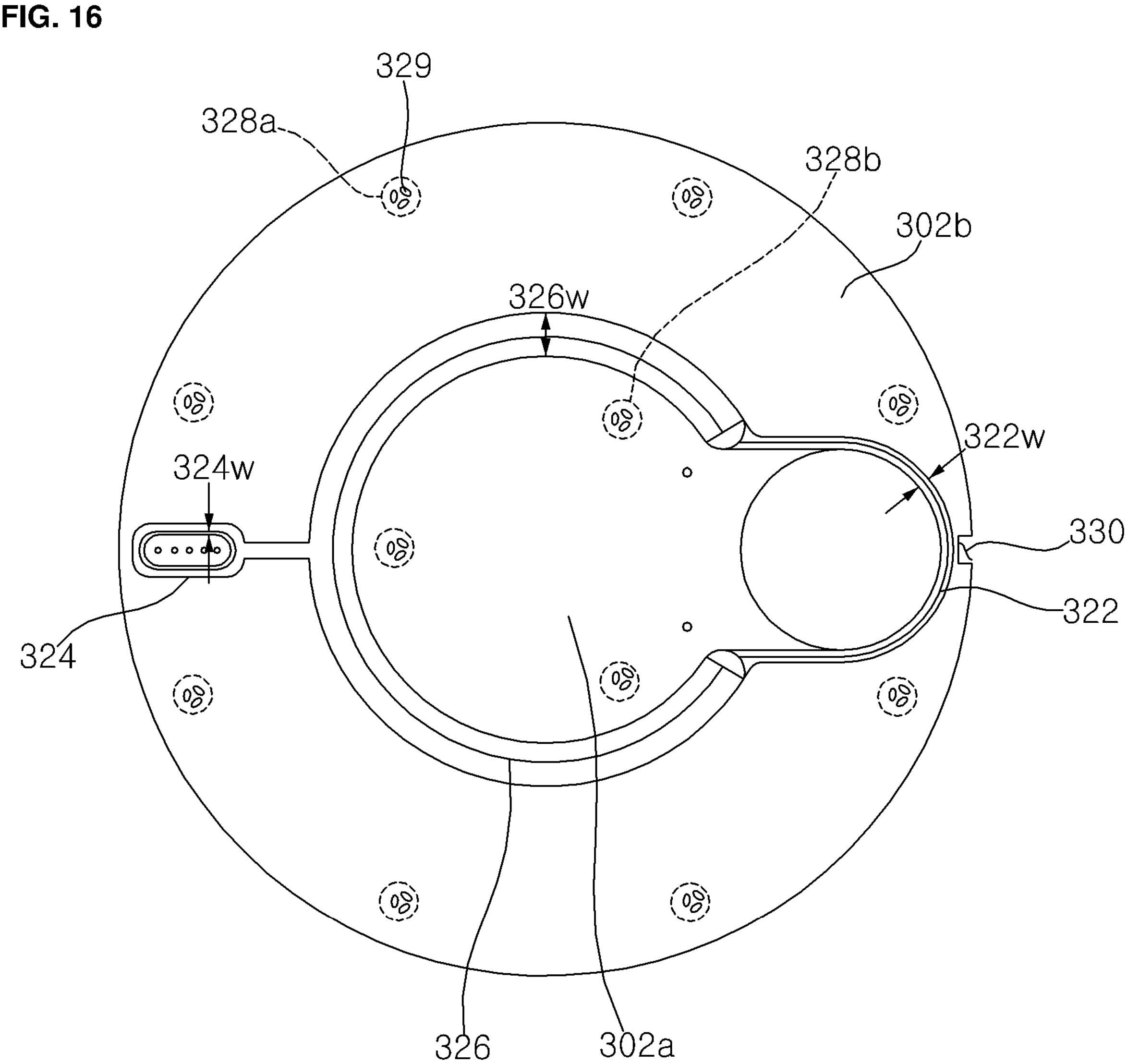
FIG. 16 shows a plan view of FIG. 15.
Figure 17:
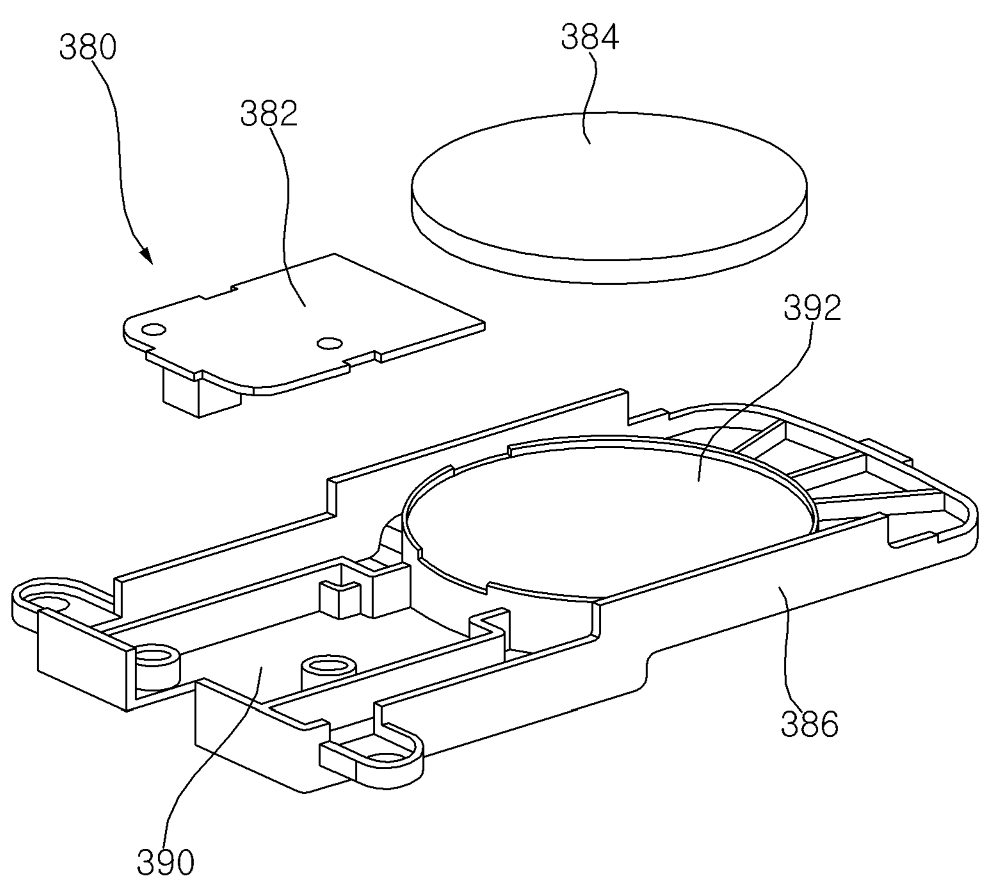
FIG. 17 shows an exploded perspective view of a charging unit according to the first embodiment.

Referring to FIG. 15 to 16, each of the first groove 322 and the second groove 324 may be connected to the connection groove 326. Referring to FIG. 6, a depth 322*h*, 324*h* of the first groove 322 and the second groove 324 may be smaller than a depth of the connection groove 326. Referring to FIG. 16, widths 322*w*, 324*w* of each of the first groove 322 and the second groove 324 may be smaller than a width 326*w* of the connection groove 326. Referring to FIG. 16, a length of the first groove 322 that extends along a periphery of the first protruding cover 306 and a length of the second groove 324 that extends along a periphery of the second protruding cover 308 may be shorter than a length of ring shape between the first groove 322 and the second groove 324 of the connection groove 326.

The plate 320 may include a first plate 302*a* disposed radially inside of the connection groove 326, and a second plate 302*b* disposed radially outside of the connection groove 326.

The first protruding cover 306 and the second protruding cover 308 may be spaced upward from the plate 302. The first protruding cover 306 may be disposed at a first hole 344 of the top cover 340, and the second protruding cover 308 may be disposed at a second hole 346 of the top cover 340.

An upper surface of the first protruding cover 306 may have a different shape from an upper surface of the second protruding cover 308. The upper surface of the first protruding cover 306 may have a different size from the upper surface of the second protruding cover 308.

Figure 7:
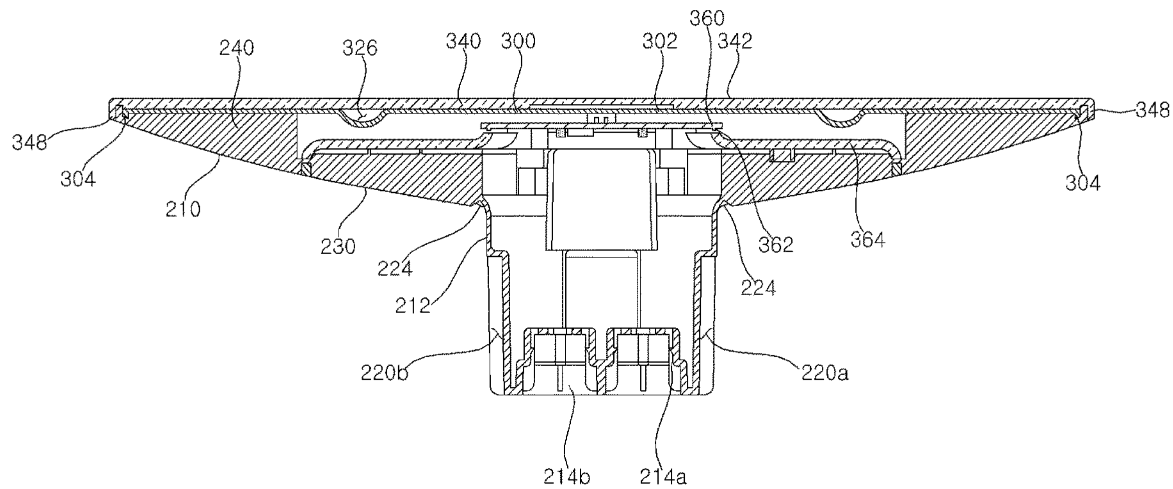
FIG. 7 shows a sectional view cut along line Y-Y' in FIG. 5.
Figure 8:
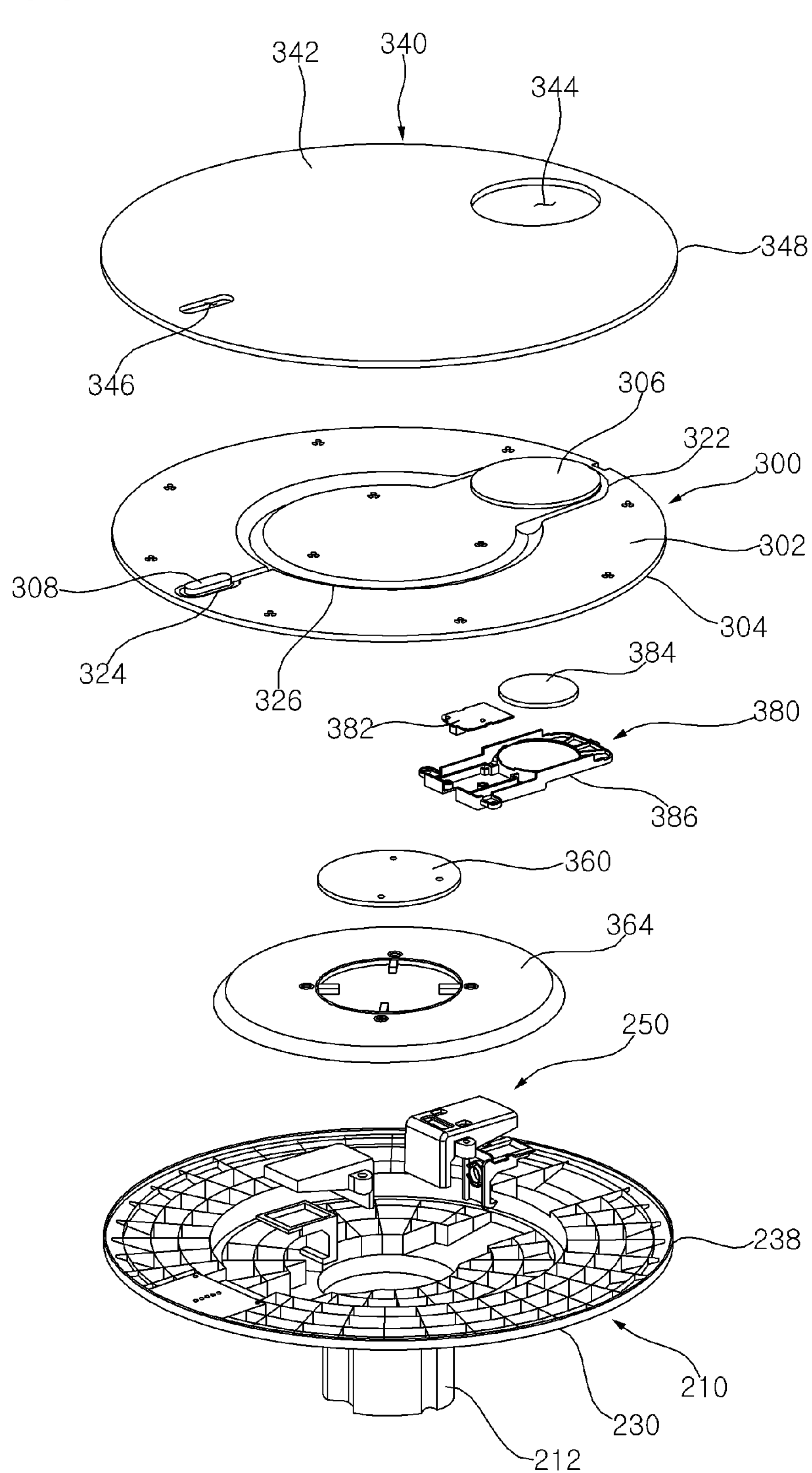
FIG. 8 shows an exploded perspective view of the upper body according to the first embodiment.
Figure 9:
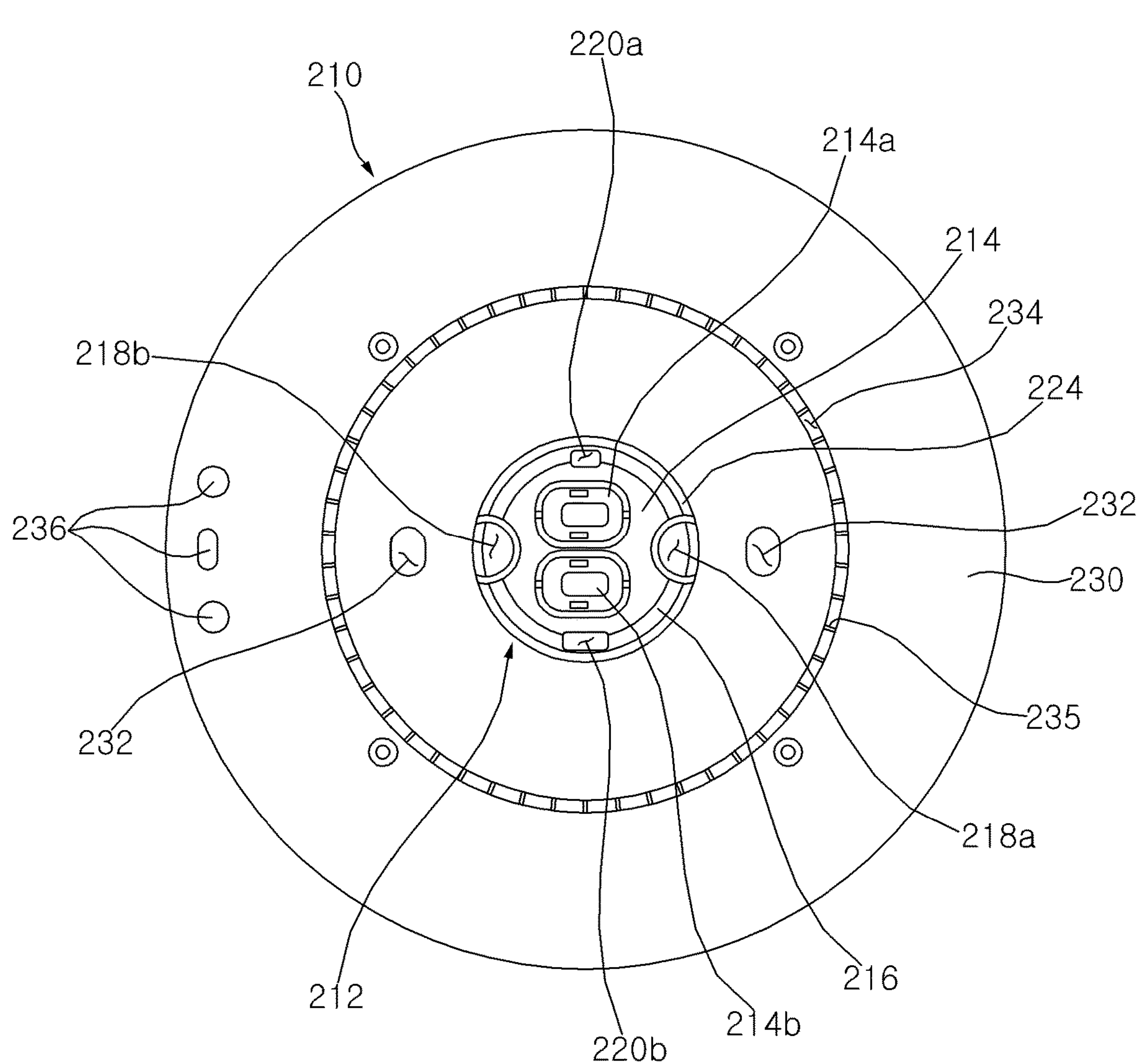
FIG. 9 shows a bottom view of a lower cover according to the first embodiment.
Figure 10:
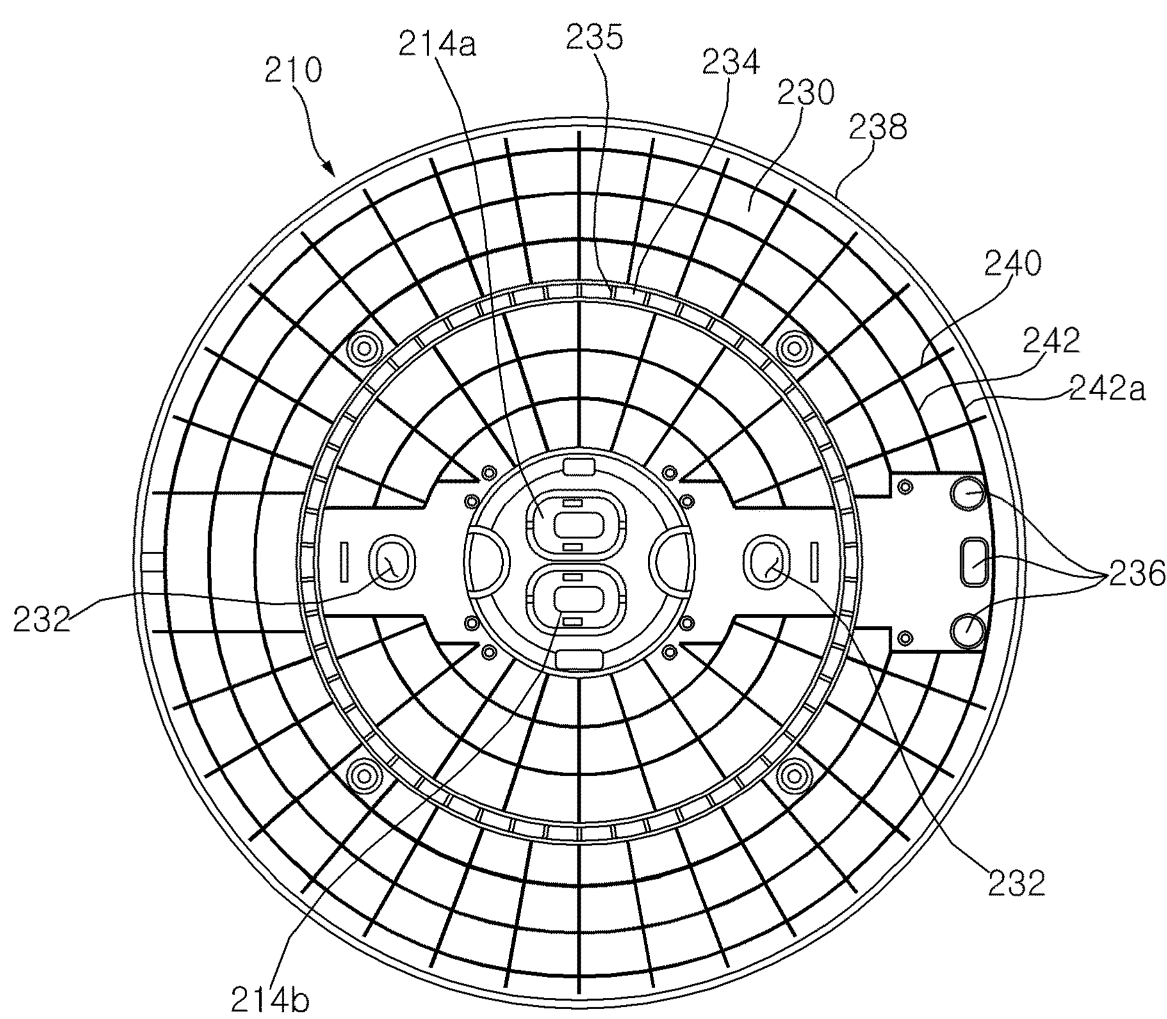
FIG. 10 shows a plan view of the lower cover according to the first embodiment.
Figure 11:
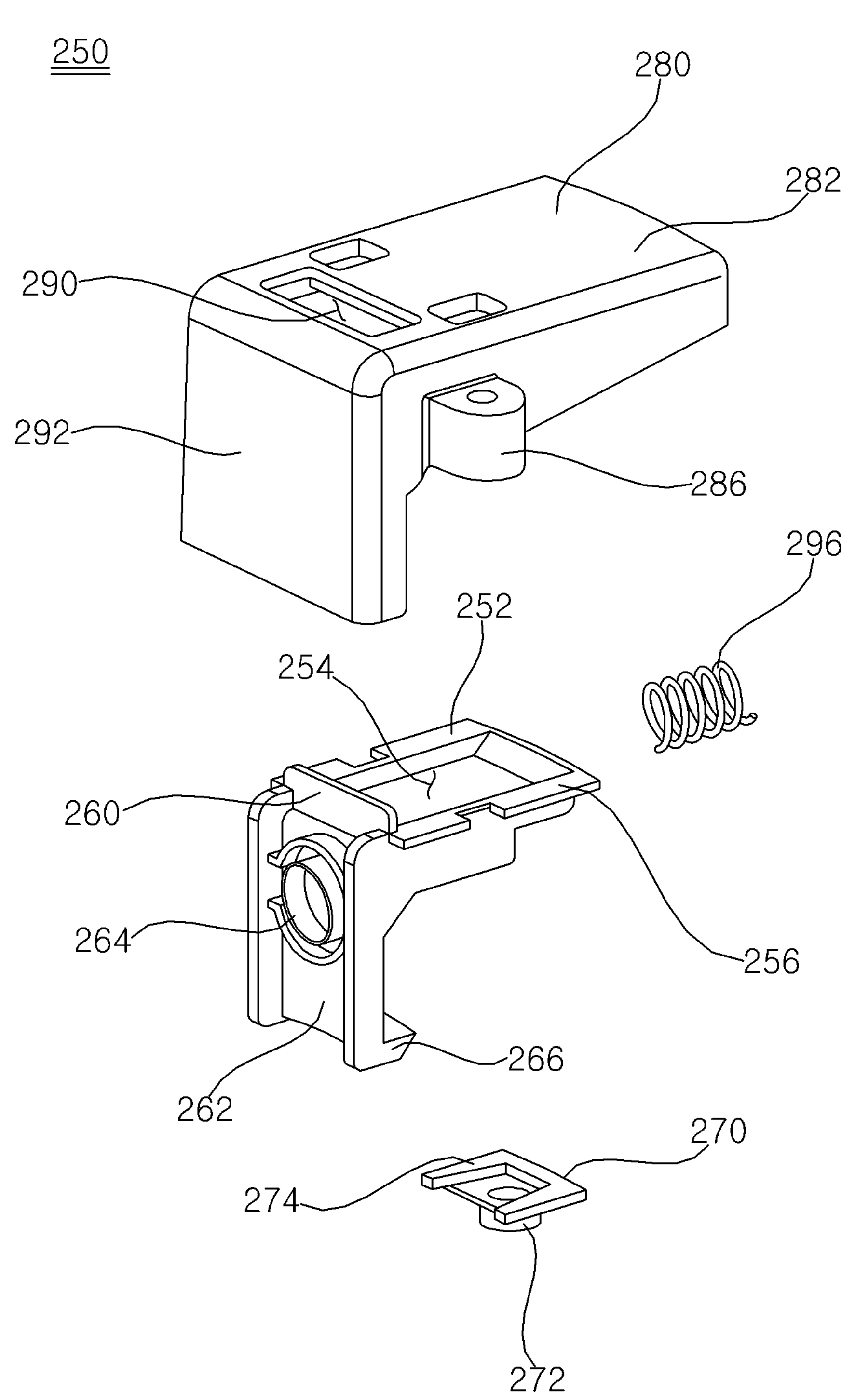
FIG. 11 shows an exploded perspective view of a coupling part according to the first embodiment.
Figures 12A, 12B:
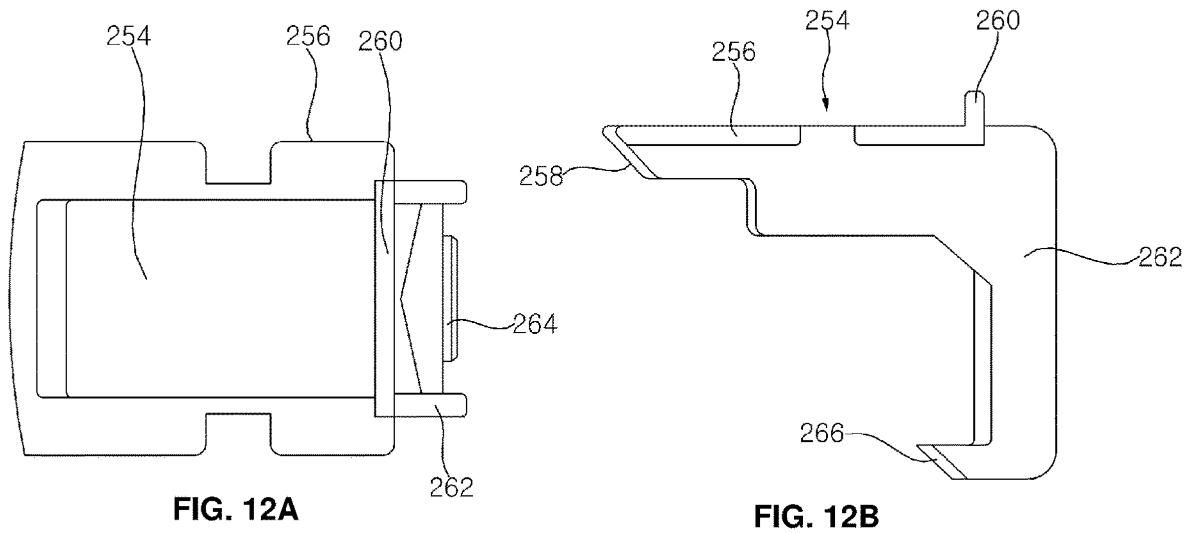
FIGS. 12A and 12B show a hook according to a first embodiment, wherein A shows a plan view and B shows a side view.
Figure 13A:
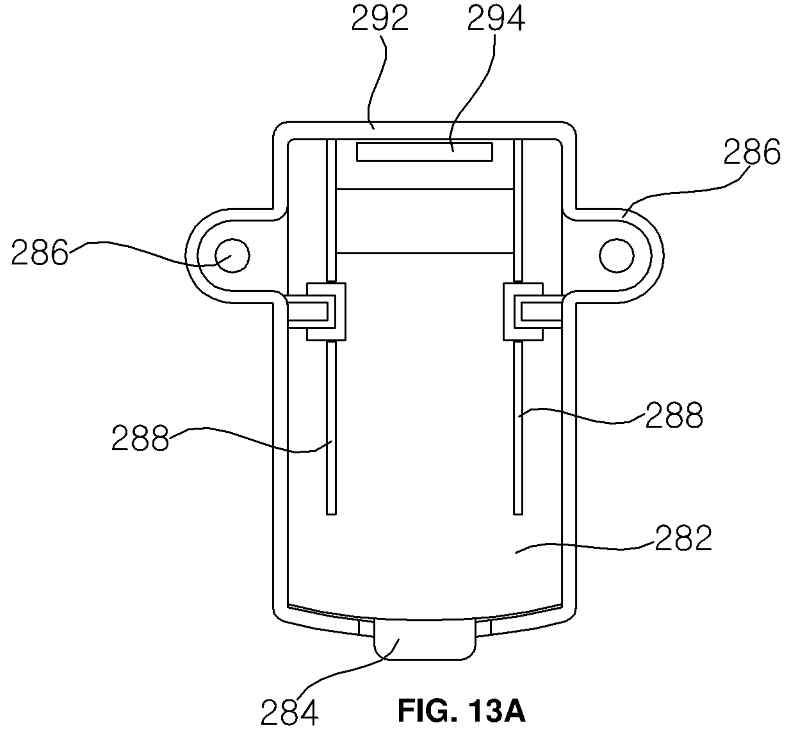
FIGS. 13A and 13B show a hook guider according to the first embodiment, wherein A shows a bottom view and B shows a front view.
Figure 13B:
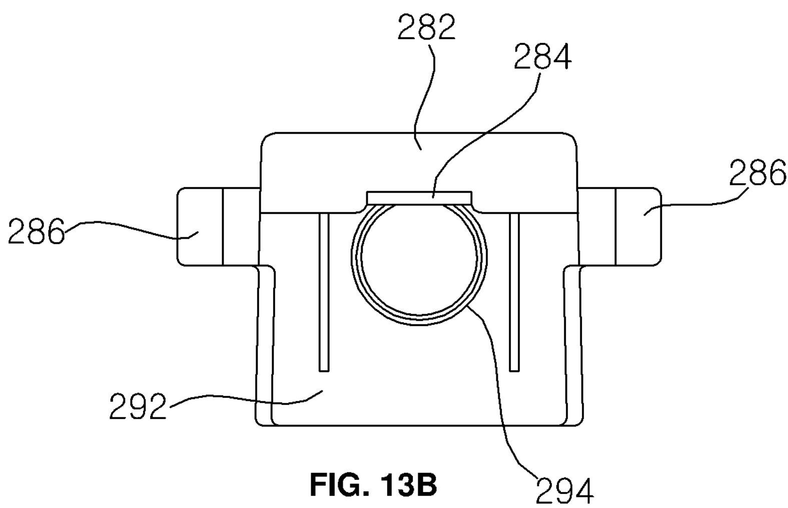
Figure 14A:
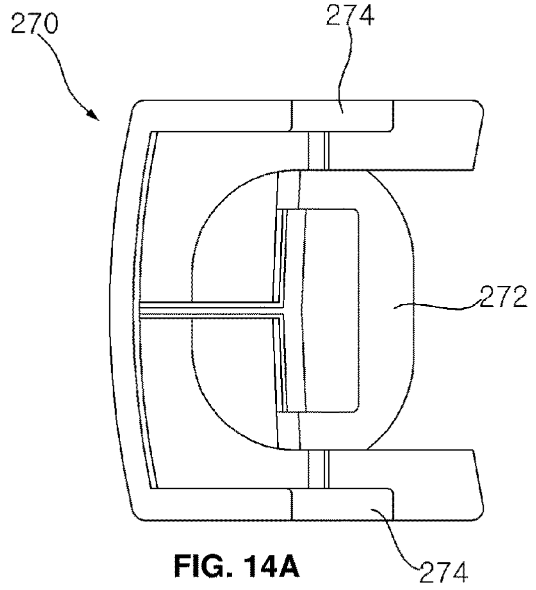
FIGS. 14A and 14B show a hook button according to the first embodiment, wherein A shows a plan view and B shows a side view.
Figure 14B:
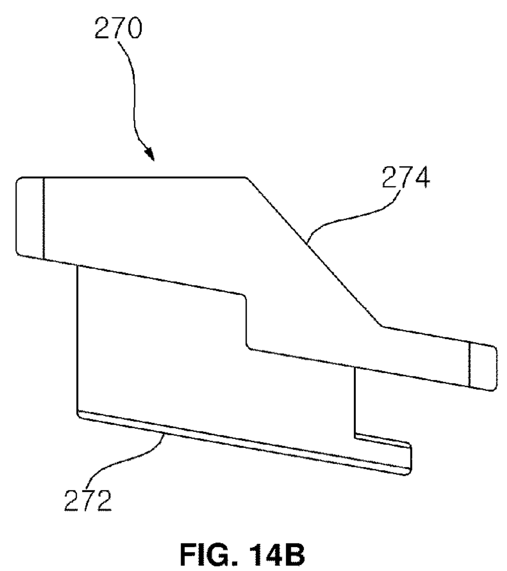

The top cover 340 may be disposed to cover at least portion of the upper cover 300. The top cover 340 may be disposed above the upper cover 300. Referring to FIGS. 6 to 7, a diameter of the top cover 340 may be larger than a diameter of an upper end portion of the lower cover 210. That is, an outer periphery wall of the top cover 340 may have a structure that surrounds an upper end portion of the lower cover 210. Therefore, it is possible to prevent fluid flowing outward from the top cover 340 from entering into the lower cover 210.

The top cover 340 may be formed of abrasion-resistant PC material. The top cover 340 may be formed of heat-resistant PC material. A hole corresponding to the protruding cover(s) 306, 308 of the upper cover 300 may be formed at the top cover 340. A plurality of holes 344, 346 may be formed at the top cover 340, and each of the plurality of holes 344, 346 may be located at positions corresponding to the protruding cover(s) 306, 308.

The top cover 340 may include a cover plate 342 and the boundary wall 348 that extends downwardly from an outer periphery of the cover plate 342.

An upper surface of the cover plate 342 may be flat. Since the upper surface of the cover plate 342 is flat, the user can put stuff on the top cover 340.

The first hole 344 in which the first protruding cover 306 is disposed and the second hole 346 in which the second protruding cover 308 is disposed may be formed at the cover plate 342. The first hole 344 may be shaped to correspond to the first protruding cover 306. The second hole 346 may be shaped to correspond to the second protruding cover 308. The first hole 344 and the second hole 346 may have shapes different to each other.

The first hole 344 and the second hole 346 may be disposed on a circumference in which a plurality of corresponding members 352*a* disposed at the top cover 340 are disposed. The first hole 344 and the second hole 346 may be are disposed on a circumference in which a plurality of first magnetic members 328*a* (or magnets) disposed at the upper cover 300. In a state in which the top cover 340 is mounted on the upper cover 300, the first hole 344 and the second hole 346 may be disposed between a plurality of magnetic members 328*a*, 328*b* (or magnets).

The top cover 340 may be disposed at same position above the upper cover 300 when the first protruding cover 306 is inserted into the first hole 344 and the second protruding cover 308 is inserted into the second hole 346.

In a state in which the top cover 340 is mounted on the upper cover 300, an upper surface of the first protruding cover 306 may form a continuous surface (or parallel surface) with the cover plate 342 of the top cover 340. In a state in which the top cover 340 is mounted on the upper cover 300, an upper surface of the second protruding cover 308 may form a continuous surface (or parallel surface) with the cover plate 342 of the top cover 340. In a state in which the top cover 340 is mounted on the upper cover 300, the upper surface of the first protruding cover 306 and the upper surface of the second protruding cover 308 may form flat surface together.

In a state in which the top cover 340 is mounted on the upper cover 300, the cover plate 342, the first protruding cover 306, and the second protruding cover 308 may form an entirely flat surface.

The state in which the top cover 340 is mounted on the upper cover 300 may mean the first protruding cover 306 and the second protruding cover 308 are respectively inserted into the first hole 344 and the second hole 346. The state in which the top cover 340 is mounted on the upper cover 300 may be a state that the corresponding member 352*a*, 352*b* of the top cover 340 interact with the magnetic member 328*a*, 328*b* of the upper cover 300. The state in which the top cover 340 is mounted on the upper cover 300 may mean a state in which the top cover 340 and the upper cover 300 contact by the corresponding member(s) 352*a*, 352*b* and the magnetic member(s) 328*a*, 328*b*.

A plurality of ribs 350 that maintain a shape of the top cover 340 may be disposed at the top cover 340. The plurality of ribs 350 may protrude downward from a lower surface of the top cover 340. The plurality of ribs 350 may have shapes of circle concentric with respect to a center of the top cover 340. The plurality of ribs 350 may be radially formed with respect to the center of the top cover 340. The plurality of ribs 350 may be disposed between the plurality of corresponding members 352*a*, 352*b*.

The plurality of magnetic members 328*a*, 328*b* may be disposed at one of the top cover 340 or the upper cover 300. The plurality of corresponding members 352*a*, 352*b* may be disposed at the other one of the top cover 340 or the upper cover 300.

Figure 18:
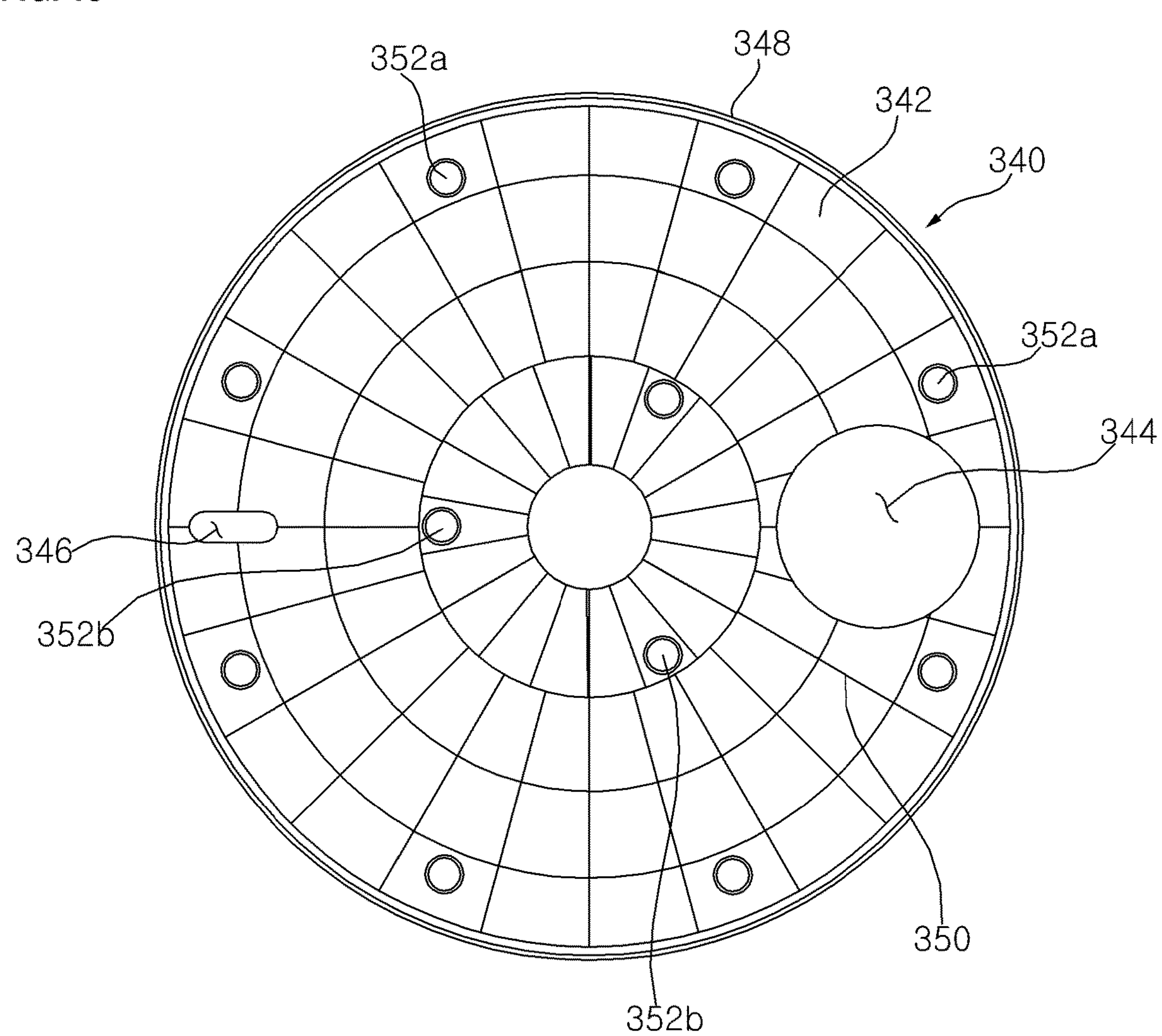
FIG. 18 shows a bottom view of a top cover according to the first embodiment.
Figure 19:
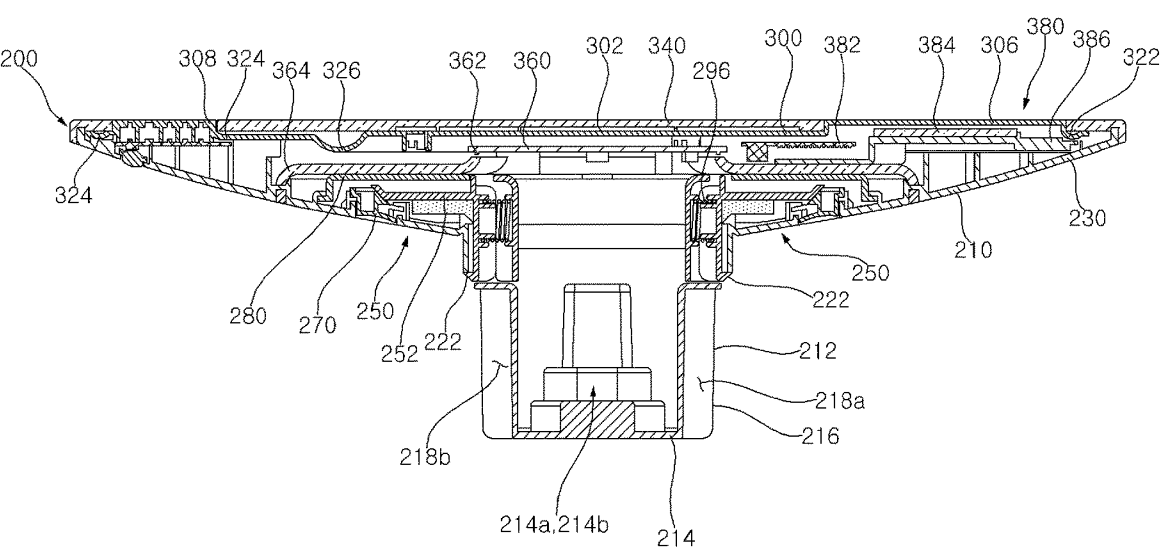
FIG. 19 shows a sectional view that a disposition of a coupling part is changed from the second body shown in FIG. 6.

Referring to FIG. 18, the plurality of corresponding members 352*a*, 352*b* may be disposed at the top cover 340. The plurality of corresponding members 352*a*, 352*b* may include a plurality of first corresponding members 352*a* that are spaced apart from a center of the top cover 340 in a radial direction, and a plurality of second corresponding members 352*b* that are spaced closer apart from a center of the top cover 340 in a radial direction than the first corresponding member 352*a*. The plurality of first corresponding members 352*a* may be disposed to be spaced apart from each other in a circumferential direction. The plurality of second corresponding members 352*b* may be disposed to be spaced apart from each other in a circumferential direction.

Referring to FIG. 16, the first magnetic member 328*a* is disposed at a position corresponding to the first corresponding member 352*a*, and the second magnetic member 328*b* is disposed at a position corresponding to the second corresponding member 352*b*.

The plurality of magnetic members 328*a*, 328*b* may be disposed at the upper cover 300. The plurality of magnetic members 328*a*, 328*b* may be mounted on a lower surface of the upper cover 300. A magnetic member hook 329 for fixing the plurality of magnetic members 328*a*, 328*b* may be disposed at the upper cover 300.

Referring to FIG. 16, the plurality of magnetic members 328*a*, 328*b* may include a plurality of first magnetic members 328*a* spaced apart in a circumferential direction, and a plurality of second magnetic members 328*b* that is disposed on a circle concentric with a circle on which the plurality of first magnetic members 328*a* are arranged and spaced apart in a circumferential direction.

A gap 328*a*1 between the plurality of first magnetic members 328*a* in the circumferential direction or a gap 328*b*1 between the plurality of second magnetic members 328*b* in the circumferential direction may be formed to be longer than a radius gap L1 between a radius of concentric circle formed by the plurality of first magnetic member 328*a* and a radius of concentric circle formed by the plurality of second magnetic member 328*b*.

Figure 20:
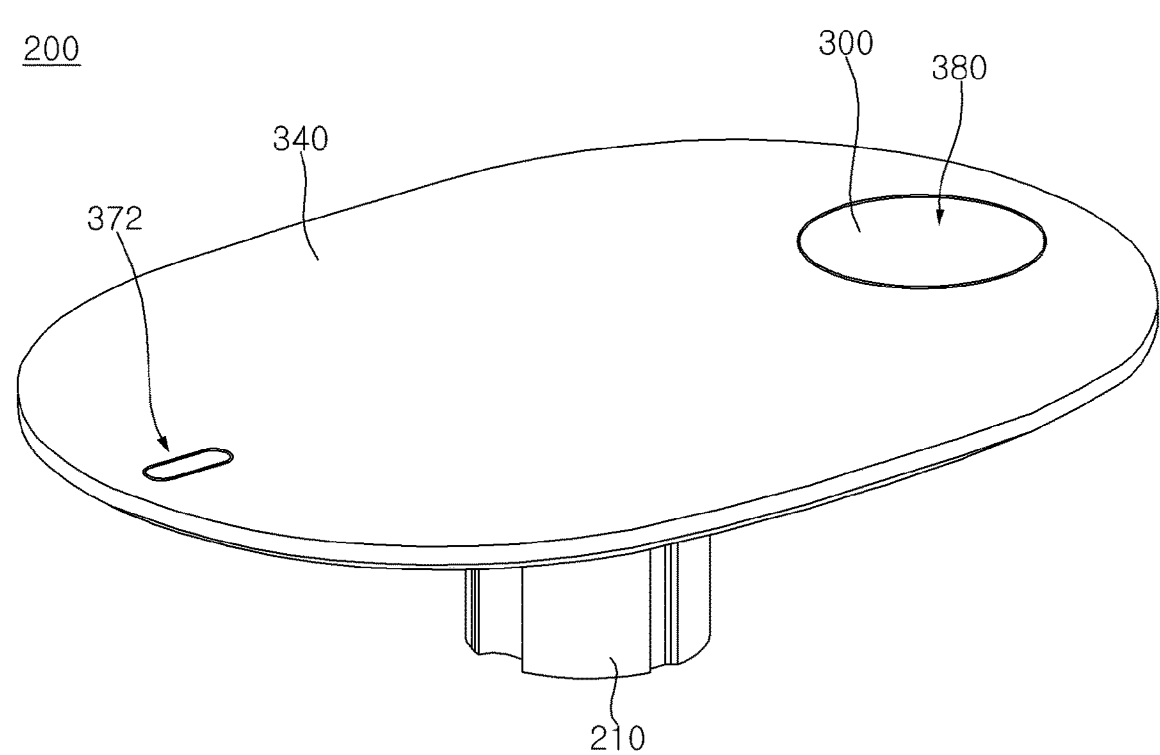
FIG. 20 shows a perspective view of a second body according to a second embodiment.

FIGS. 20 to 23 may show and describe a second body according to a second embodiment. The second body 200 according to the second embodiment may have same elements with the second body 200 according to the first embodiment. Referring to FIG. 20, the second body 200 may include the lower cover 210, the upper cover 300, and the top cover 340.

Figure 21:
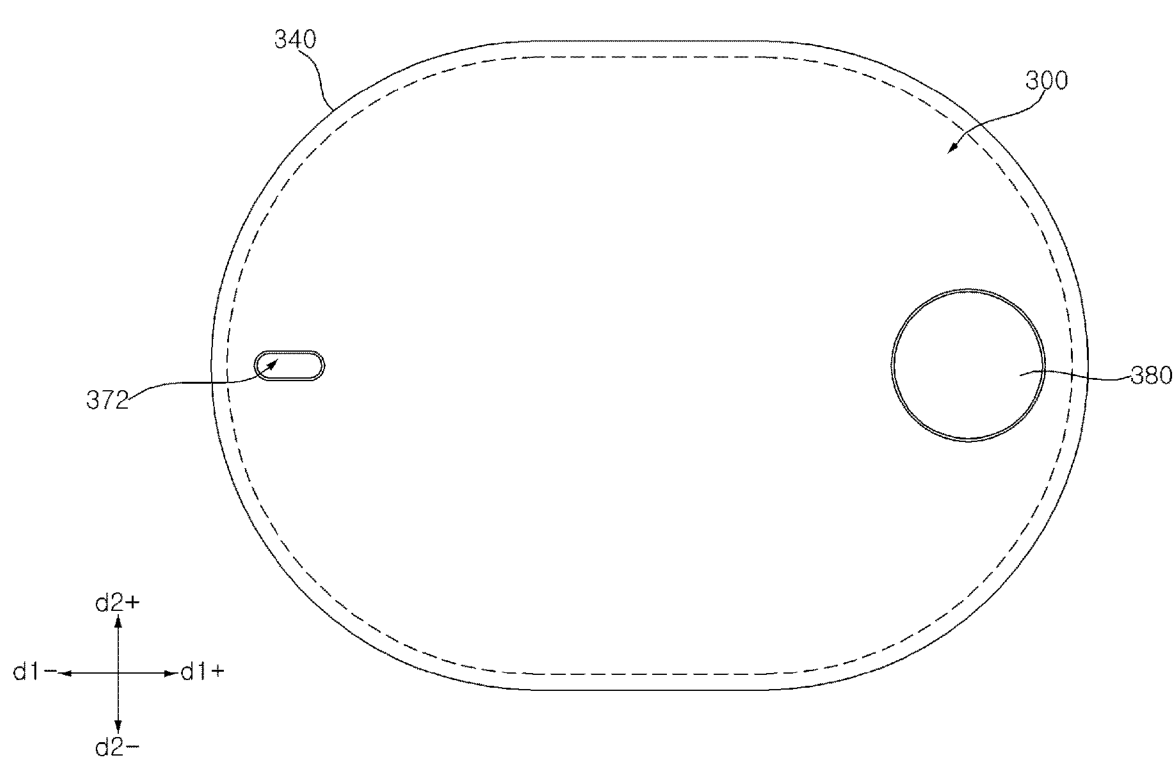
FIG. 21 shows a plan view of FIG. 20.

However, in aspect of shape, the second body 200 may have an oval shape when viewed from the top. Referring to FIG. 21, the second body 200 may have an oval shape elongated in a direction in which the charging unit 380 (or charging device) and the second lamp 372 are disposed. Referring to FIG. 21, a maximum radius thereof may be formed in a first direction d1+/d1− in which the charging unit 380 and the second lamp 372 are disposed, and a minimum radius thereof may be formed in a second direction d2+/d2− which is perpendicular to the first direction d1+/d1−.

The upper cover 300 may have an oval shape that covers an upper side of the lower cover 210. The upper cover 300 may include a plate, and at least one protruding cover 306, 308 protruding upwardly from the plate.

The top cover 340 may be disposed above the upper cover 300 and may have an oval shape.

Figure 22:
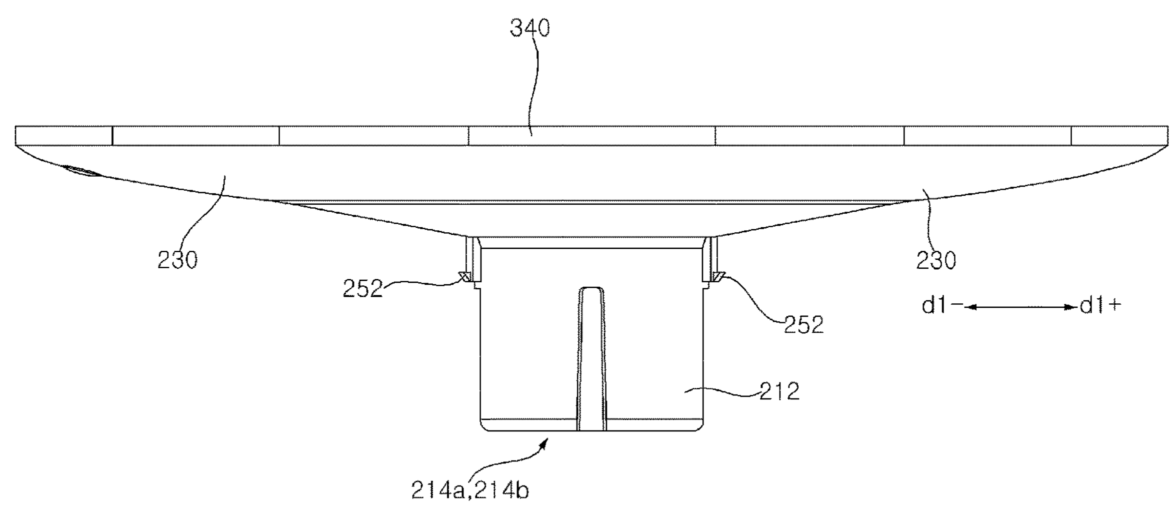
FIG. 22 shows a side view in one direction of FIG. 20.
Figure 23:
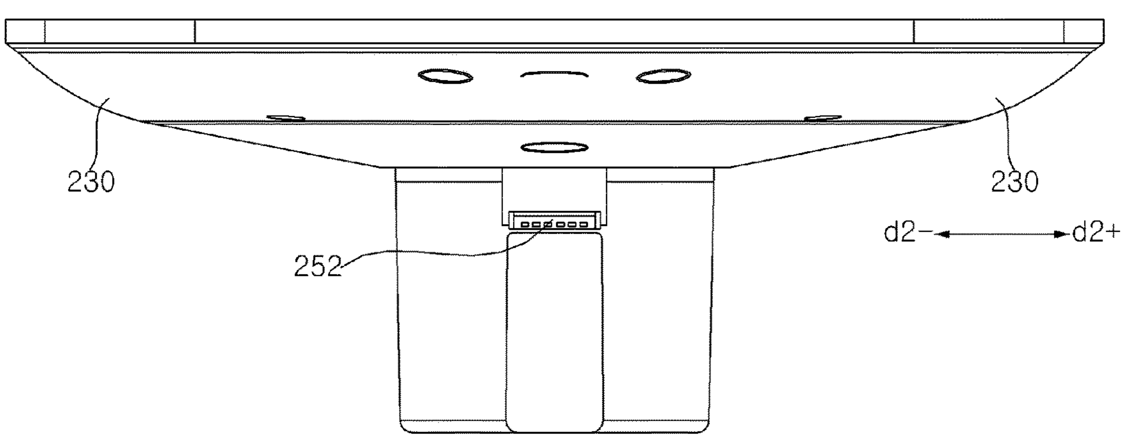
FIG. 23 shows a side view in another direction of FIG. 20.

Referring to FIGS. 22 to 23, the lower cover 210 may include the guide wall 230 that guides air discharged from the outlet 174*a* in a radially outward direction (or outward direction) and the insertion pole 212 extending downwardly from a lower end portion of the guide wall 230 and inserted into the coupling groove 160*a* of the first body 100.

The insertion pole 212 may have a structure same as the first embodiment. That is, a hole in which the hook 252 protrudes may be formed at a peripheral surface of the insertion pole 212. A corresponding terminal(s) 214*a*, 214*b* that is electrically connected to the connection terminal 158*a*, 158*b* (FIG. 4) disposed at the first body 100 may be disposed at a lower wall 214 of the insertion pole 212. Therefore, regardless of a structure of the guide wall 230, the second body 200 of the second embodiment may be mounted on the coupling groove 160*a* (FIG. 4) of the first body 100.

Referring to FIGS. 22, 23, a portion of the guide wall 230 that extends along the second direction d2/d2− may be formed to be gentler than a portion of the guide wall 230 that extends along the first direction d1+/d1−.

Figure 24:
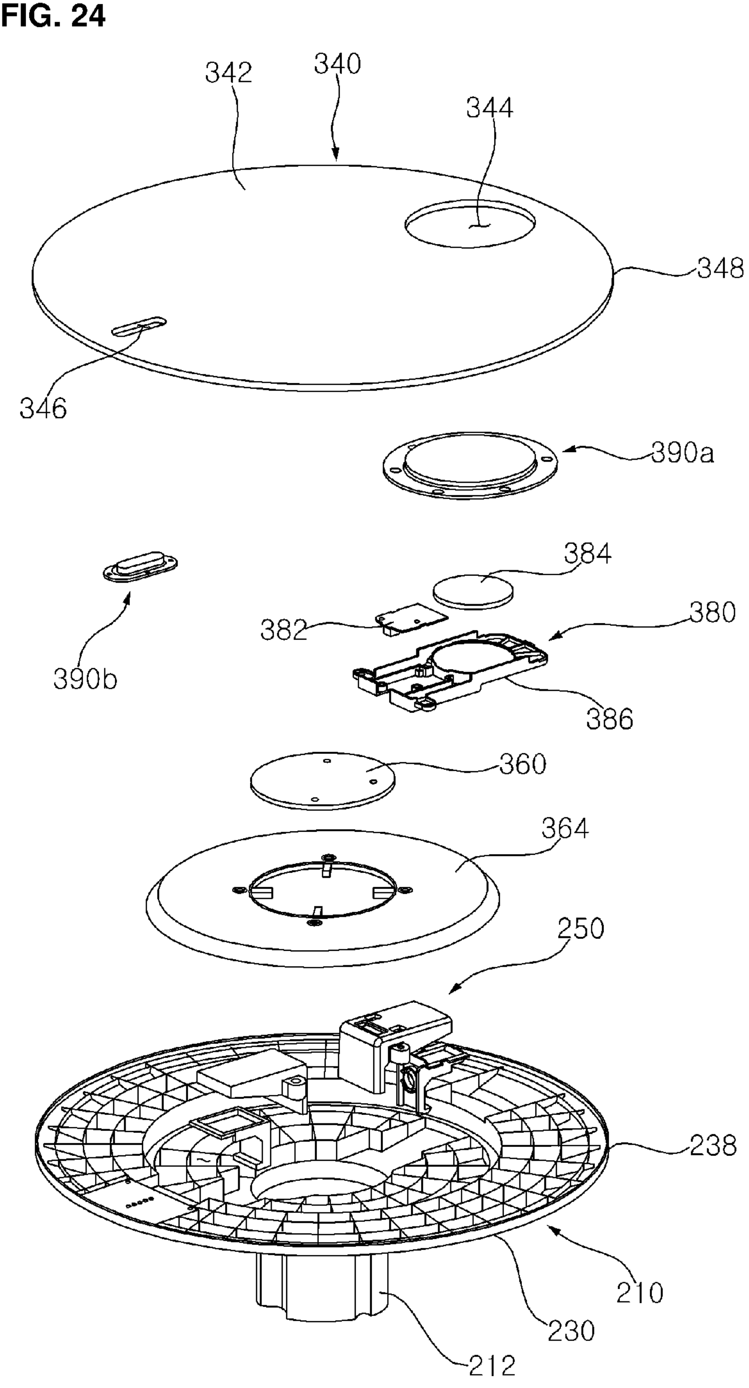
FIG. 24 shows an exploded perspective view of a second body according to a third embodiment.
Figures 25A, 25B:
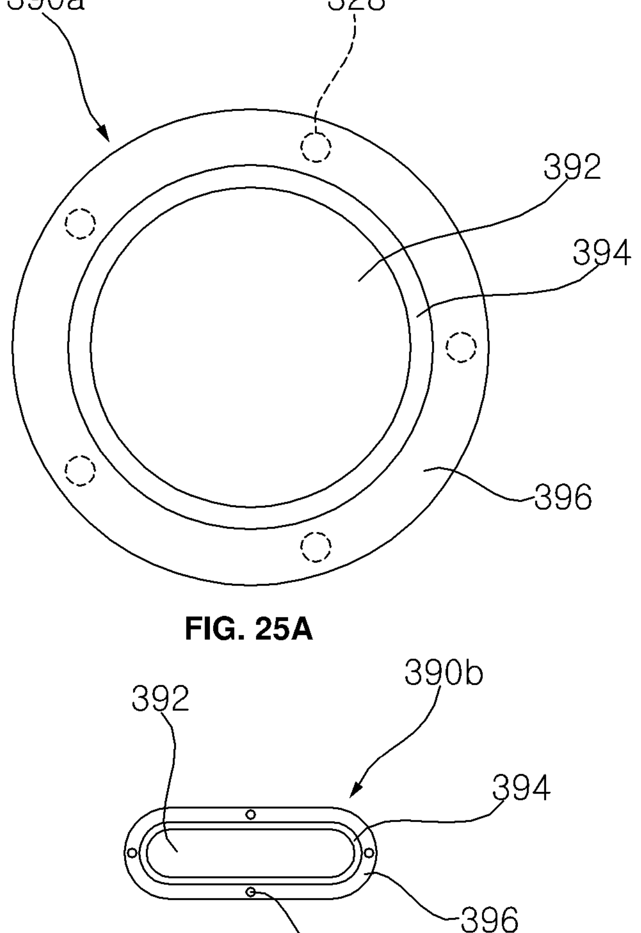
FIGS. 25A and 25B is for explaining a structure of a hole cover included in the second body of the third embodiment, wherein A shows a plan view of the first hole cover and B shows a plan view of the second hole cover.

FIGS. 24, 25 may show and describe a second body 200 according to a third embodiment. The second body 200 of the third embodiment may include a hole cover 390*a*, 390*b* and excluding the upper cover from a structure of the second body 200 according to the first embodiment. The structure of the second body according to the third embodiment may be applied to a structure thereof according to the second embodiment.

Referring to FIG. 24, the second body 200 may include the lower cover 210, the coupling portion 250, the second lamp 372, the charging unit 380, and the top cover 340.

The second body 200 may be fixed to the lower cover 210 or the top cover 340 and may include a hole cover 390*a*, 390*b* mounted on the hole(s) 344, 346 formed at the top cover 340.

The first hole 344 and the second hole 346 may be formed at the top cover 340.

Referring to FIG. 24, the hole cover 390*a*, 390*b* may include a first hole cover 390*a* that is disposed at the first hole 344 and a second hole cover 390*b* that is disposed at the second hole 346. The first hole cover 390*a* may cover an upper side of the charging unit 380 that is disposed at the lower cover 210. The second hole cover 390*b* may cover an upper side of the second lamp 372 that is disposed at the lower cover 210. Each of the first hole cover 390*a* and the second hole cover 390*b* may be sized to correspond to the first hole 344 and the second hole 346, respectively.

Each of the first hole cover 390*a* and the second hole cover 390*b* may include an upper hole covers 392 that are respectively disposed at the first hole 344 and the second hole 346, and a lower hole cover 394 that is disposed below the top cover 340, and a connection plate 396 that extends from the lower hole cover 394 in a radially outward direction.

FIG. 25 shows and describes a structure of the first hole cover 390*a* and the second hole cover 390*b*. Each of the first hole cover 390*a* and the second hole cover 390*b* may include an upper hole cover 392 that is disposed at the first hole 344, and a lower hole cover 394 that is disposed at an outer periphery of the upper hole cover 392 and which forms a groove depressed downward, and the connection plate 396 that extends from an outer periphery of the lower hole cover 394 in a radial direction.

The upper hole cover 392 may have a cylindrical shape in which an upper side thereof is closed and that is flat. The upper hole cover 392 may include an upper peripheral wall 392*b* that extends downward along an edge of an upper plate 392*a*.

An upper surface of the upper hole cover 392 may form a continuous surface with an upper surface formed by the top cover 340.

The lower hole cover 394 may be disposed at a lower end portion of the upper hole cover 392. The lower hole cover 394 may have a structure that extends from a lower end portion of the upper peripheral wall 392*b* in a radially outward direction. Therefore, the lower hole cover 394 may have a ring shape that extends along the outer periphery of the upper hole cover 392.

The lower hole cover 394 may have a shape of a groove that is depressed downward. Therefore, even if water spilled from an upper side of the top cover 340 moves downward through the first hole 344, the filled water may be prevented from entering into the lower cover 210.

The connection plate 396 may have a structure that extends from the lower periphery of the lower hole cover 394 in a radially outward direction.

The connection plate 396 may be fixed to the lower cover 210 or the top cover 340.

The connection plate 396 may be fixed to the lower cover 210 and may have a magnetic member disposed thereat. In addition, a corresponding member may be disposed at a position corresponding to the magnetic member 328 at the top cover 340. Therefore, the top cover 340 may contact the lower cover 210 or the hole cover 390*a*, 390*b* when the top cover 340 is disposed above the lower cover 210.

Figure 26:
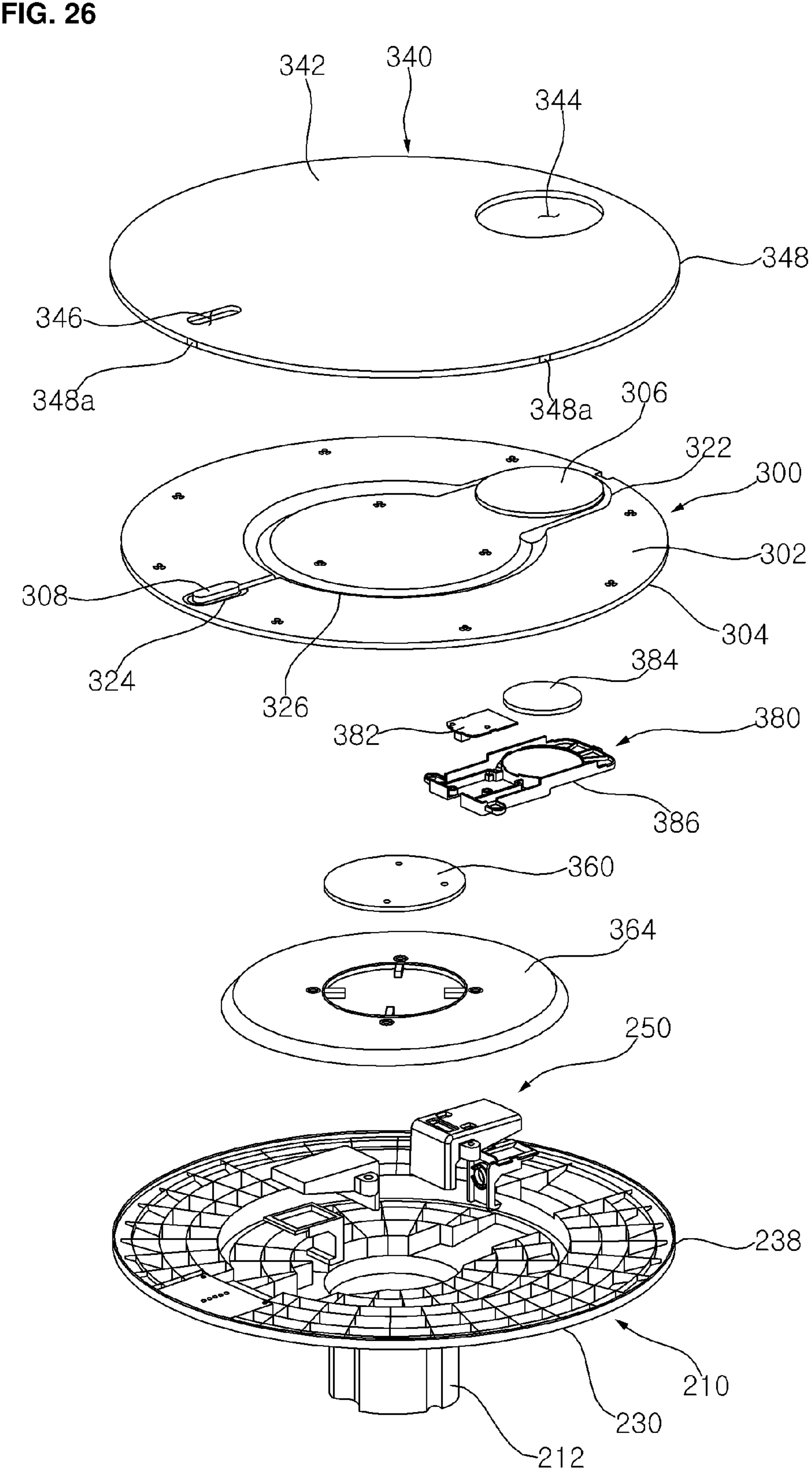
FIG. 26 shows an exploded perspective view of a second body according to a fourth embodiment.
Figure 27:
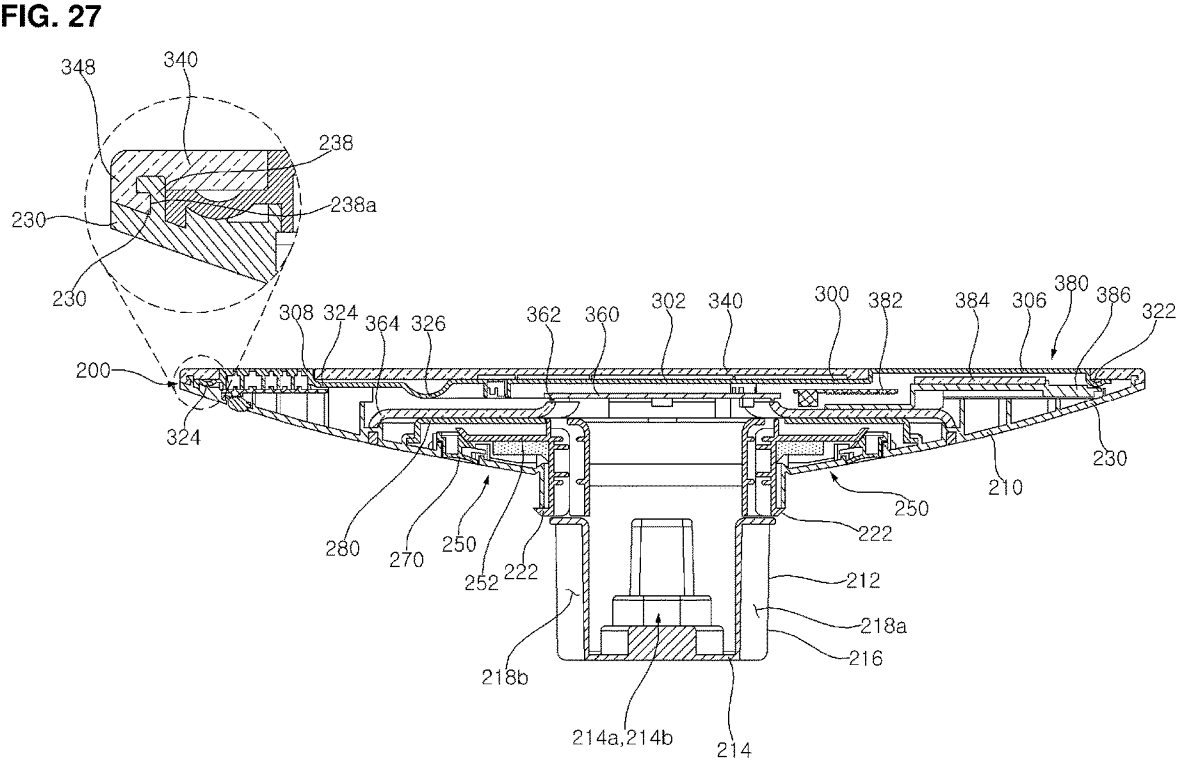
FIG. 27 shows a sectional view for explaining a coupling relationship of the second body of the fourth embodiment.

Referring to FIGS. 26, 27, a second body 200 according to a fourth embodiment may be described. The second body 200 according to the fourth embodiment may differ from the second body 200 according to the first embodiment in that the top cover 340 is coupled to one side of the lower cover 210. That is, the magnetic member and the corresponding member are deleted from the second body 200 according to the first embodiment and the top cover 340 is fixed to the lower cover 210 by another fastening structure.

Referring to FIG. 26, the second body 200 may include the lower cover 210, the upper cover 300, and the top cover 340. Other element of the second body may be same with the elements of the first embodiment.

A top cover protrusion 348*a* fixed to the lower cover 210 may be disposed at the top cover 340. The top cover protrusion 348*a* may be disposed at a lower end portion of a boundary wall 348 of the top cover 340.

The top cover 340 may include a disc-shaped cover plate 342 and a boundary wall 348 that extends downwardly from an outer circumferential end of the cover plate 342 and the top cover protrusion 348*a* protruding radially inward is disposed at a lower end portion of the boundary wall 348. The top cover protrusion 348*a* may be formed at a whole surface of the boundary wall 348 or at a plurality of areas spaced apart in a circumferential direction.

A rib groove 238*a* that the top cover protrusion 348*a* is inserted may be formed at the lower cover 210.

The lower cover 210 may include the guide wall 230 extending in a radially outward direction above the outlet 174*a* and the edge rib 238 extending upwardly from an outer circumferential end portion of the guide wall 230, and the rib groove 238*a* may be formed at a lower end portion of the edge rib 238.

The rib groove 238*a* may be formed above the guide wall 230. Referring to FIG. 27, an outer circumferential end of the guide wall 230 may have a structure that protrudes further than a lower end of the edge rib 238 in a radially outward direction (or outward direction). Air discharged from the outlet 174*a* may flow from an inner circumferential end and an outer circumferential end of the guide wall 230 in a radially outward direction (or outward direction). The lower end portion of the boundary wall 348 of the top cover 340 may be disposed to contact an upper surface of the guide wall 230 in a state that the top cover 340 is mounted on the lower cover 210.

Figure 28:
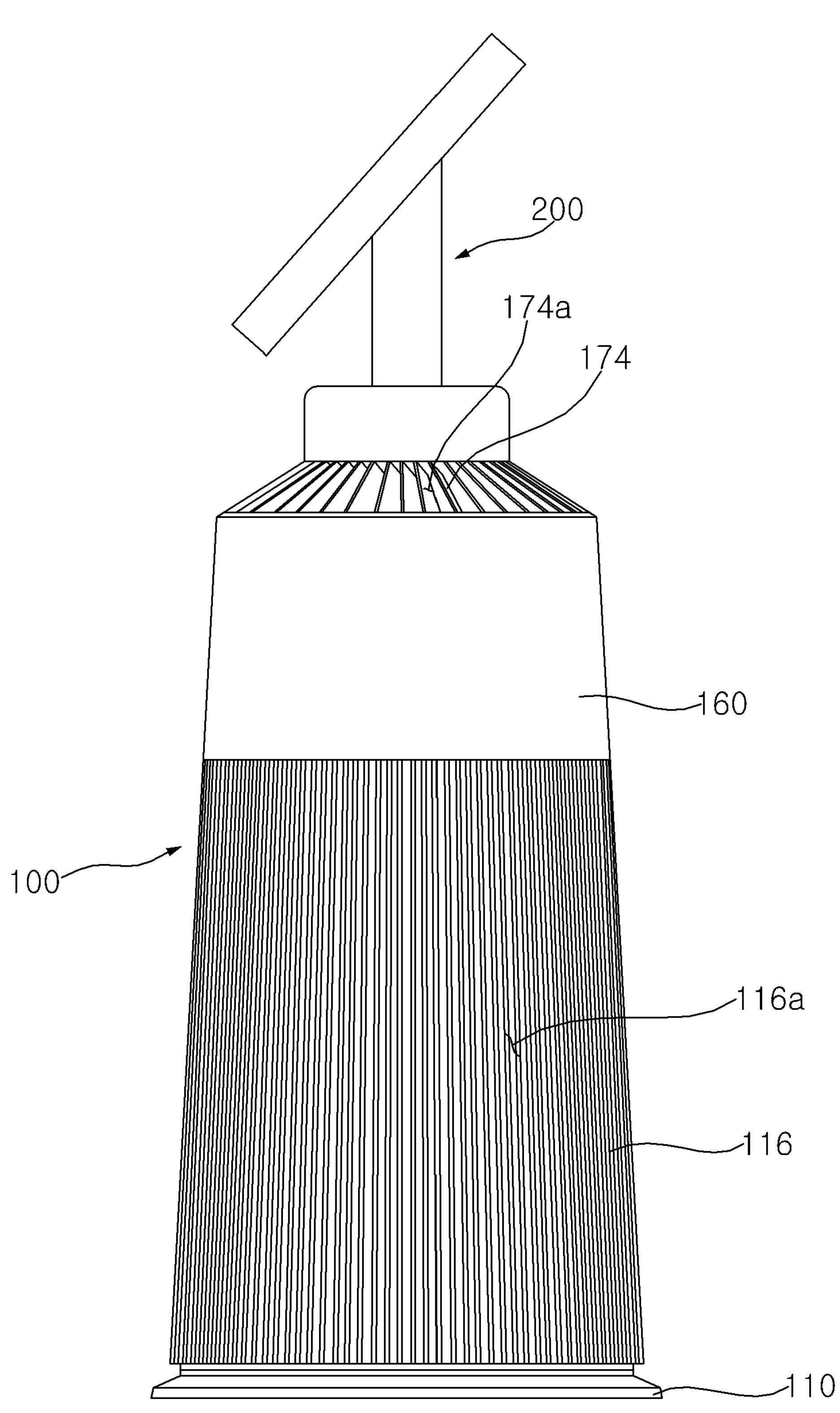
FIG. 28 shows the air cleaner equipped with a second body according to a fifth embodiment.
Figure 29:
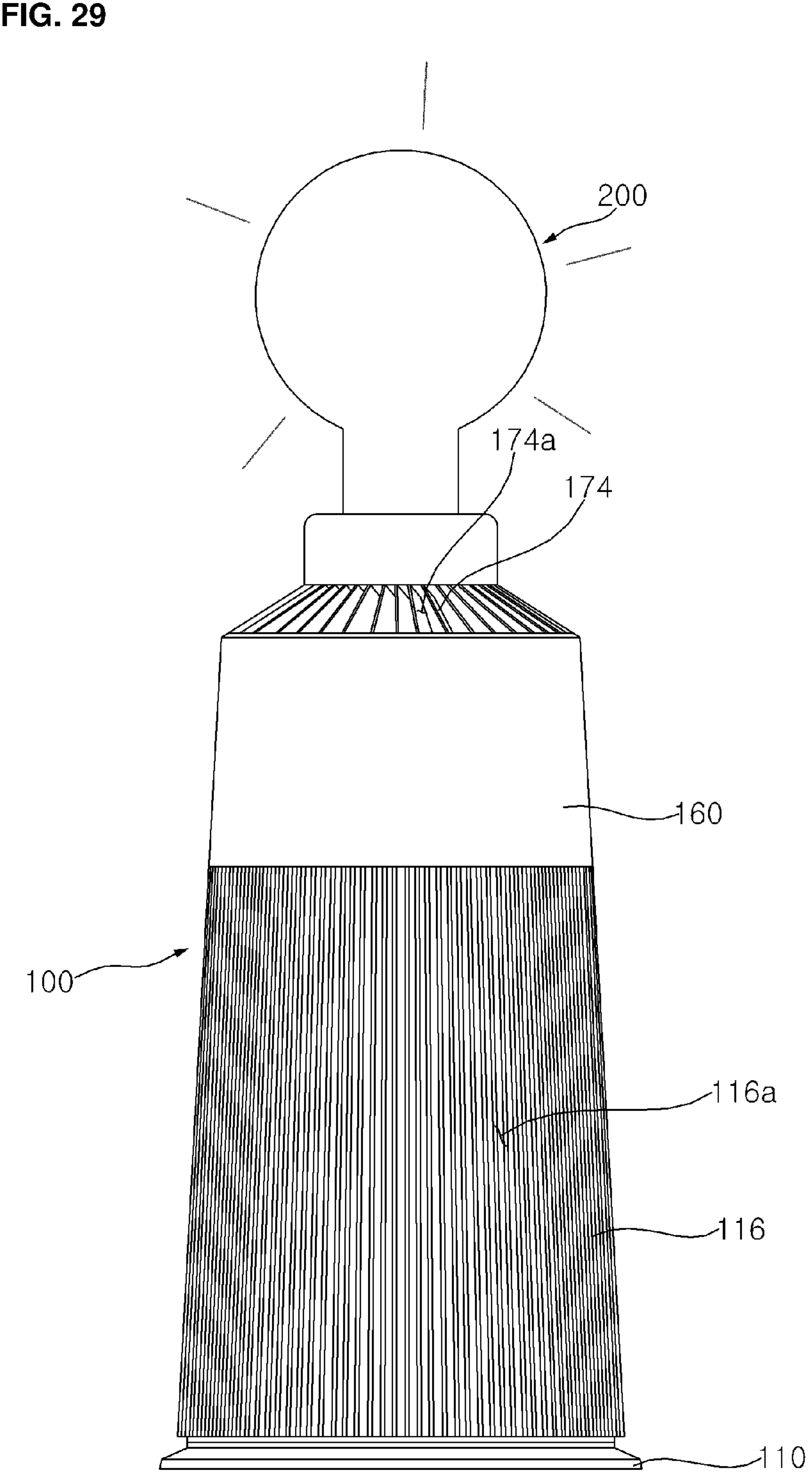
FIG. 29 shows the air cleaner equipped with a second body according to a sixth embodiment.

FIGS. 28 and 29 disclose that the second body 200 is mounted on an upper side of the first body 100 and that performs other function. Referring to FIG. 28, the second body 200 may perform a function of outputting an image, or video. The second body 200 may include a structure of the insertion pole 212 and a display 400*a* may be disposed above the insertion pole 212.

The insertion pole 212 may have a structure that is fixed to the coupling groove 160*a*. The corresponding pole terminal 214*a*, 214*b* may be connected to the connection terminal 158*a*, 158*b* disposed at the coupling groove 160*a* when the insertion pole 212 is mounted on the coupling groove 160*a* of the first body 100.

Referring to FIG. 29, the second body 200 may perform as a light that emits light. The second body 200 may have a structure of the insertion pole 212, that is mounted on the first body 100, at a lower portion thereof and a light 400*b* may be disposed above the insertion pole 212.

Referring to FIGS. 30 to 33, a base supporter 102 that prevents a turnover of the air cleaner may be described.

The first body 100 may further include the base supporter 102 that is fixed to one side of the first body 100 and that supports the air cleaner against the ground.

Figure 30:
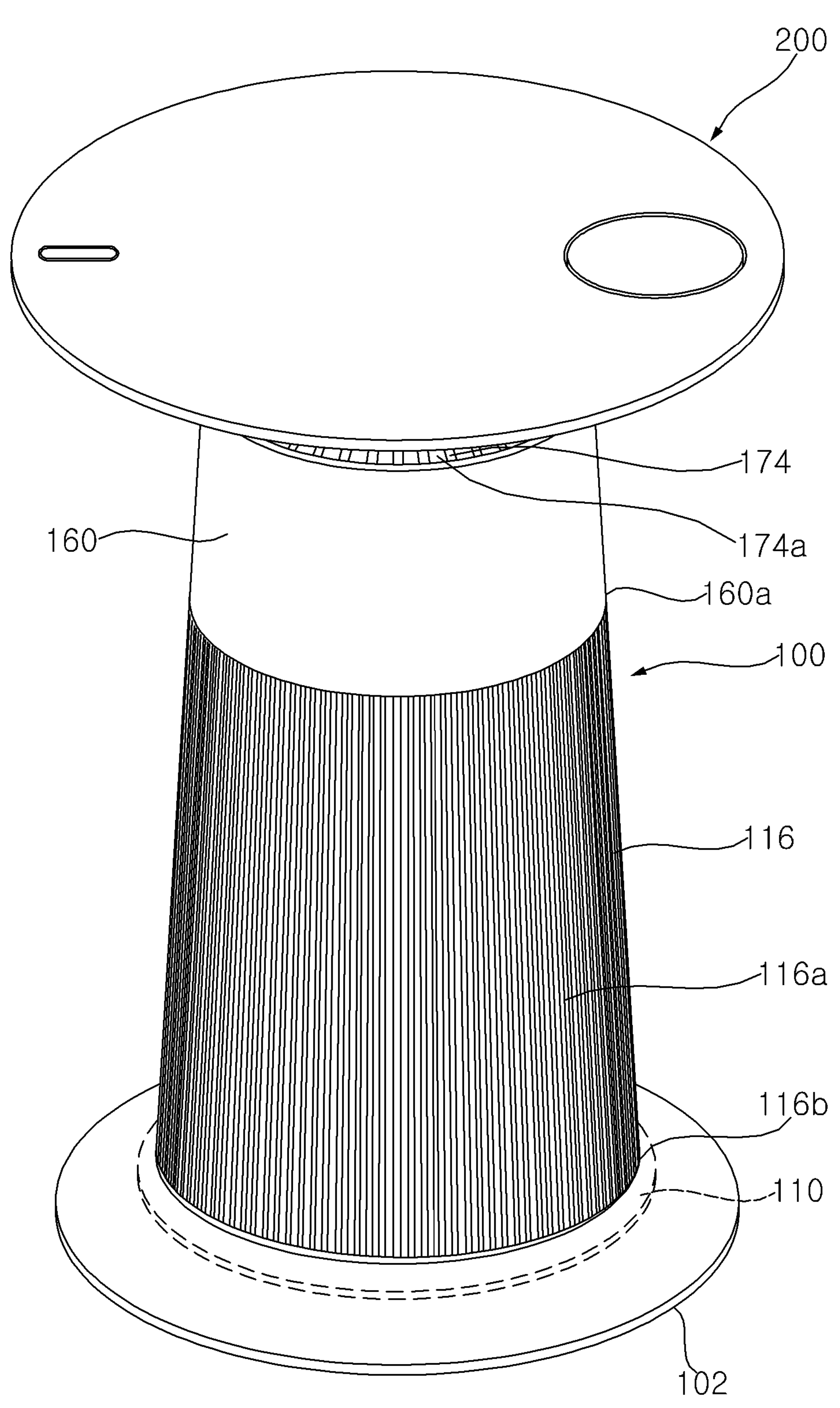
FIG. 30 shows a perspective view of the air cleaner at which a base supporter according to the first embodiment is added to the air cleaner according to the first embodiment.
Figure 31:
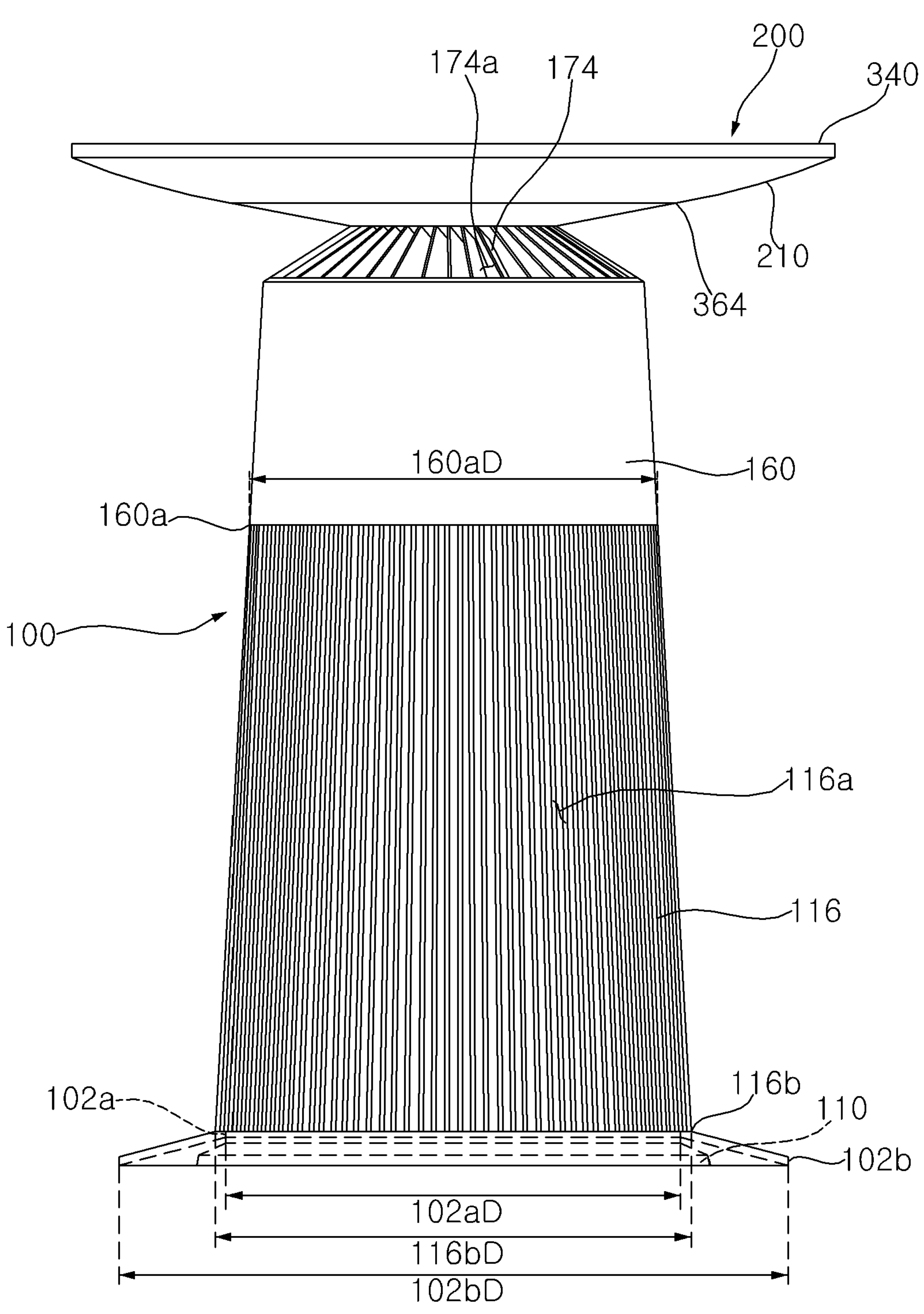
FIG. 31 shows a side view of FIG. 30.

Referring to FIGS. 30 and 31, the base supporter according to the first embodiment may be opened in up-down direction and may have a cone shape that an upper end thereof is cut. The base supporter 102 may have a shape that a radius thereof expands as it goes upward.

Referring to FIG. 31, the base supporter 102 may be disposed under the inlet grille 116. The base supporter 102 may be disposed at an outer periphery of the base 110. The base supporter 102 may have a structure that is mounted on an upper side of the base 110.

Referring to FIG. 31, a diameter of an upper end portion 102*a* of the base supporter 102 may be smaller than a diameter of a lower end portion 116*b* of the inlet grille 116. Therefore, an upper end of the base supporter 102 may be fixed thereto. A lower end 102*b* of the base supporter 102 may be disposed to contact the ground. The diameter of the upper end portion 102*a* (of the base supporter 102) may be larger than a diameter of a lower end portion 160*a* of the upper housing 160.

Therefore, the base supporter 102 may be inserted into an upper side of the base 110 in a state that the second body 200 and the inlet grille 116 are separated.

Figure 32:
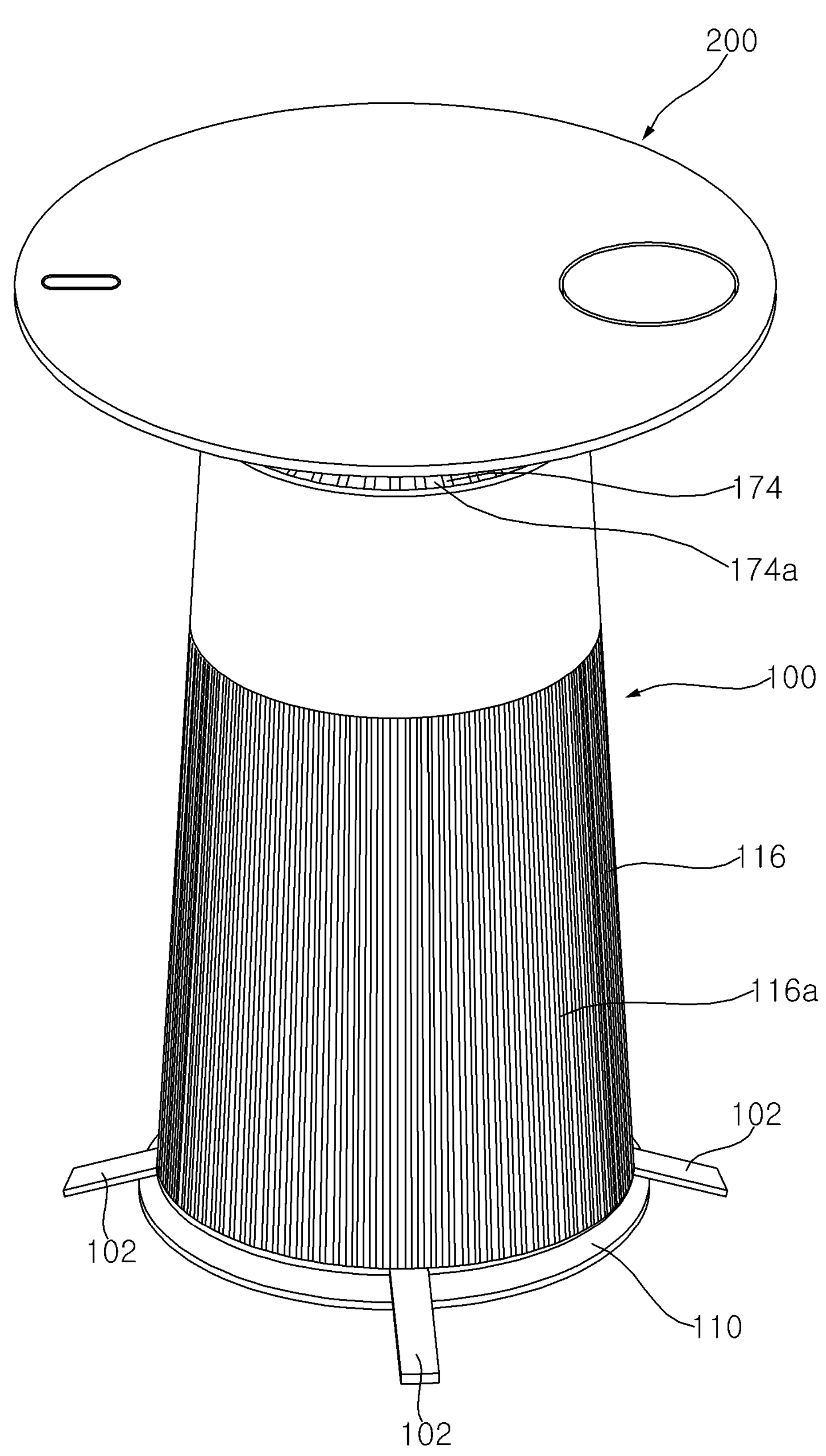
FIG. 32 shows a perspective view of the air cleaner at which a base supporter according to the second embodiment is added to the air cleaner according to the first embodiment.
Figure 33:
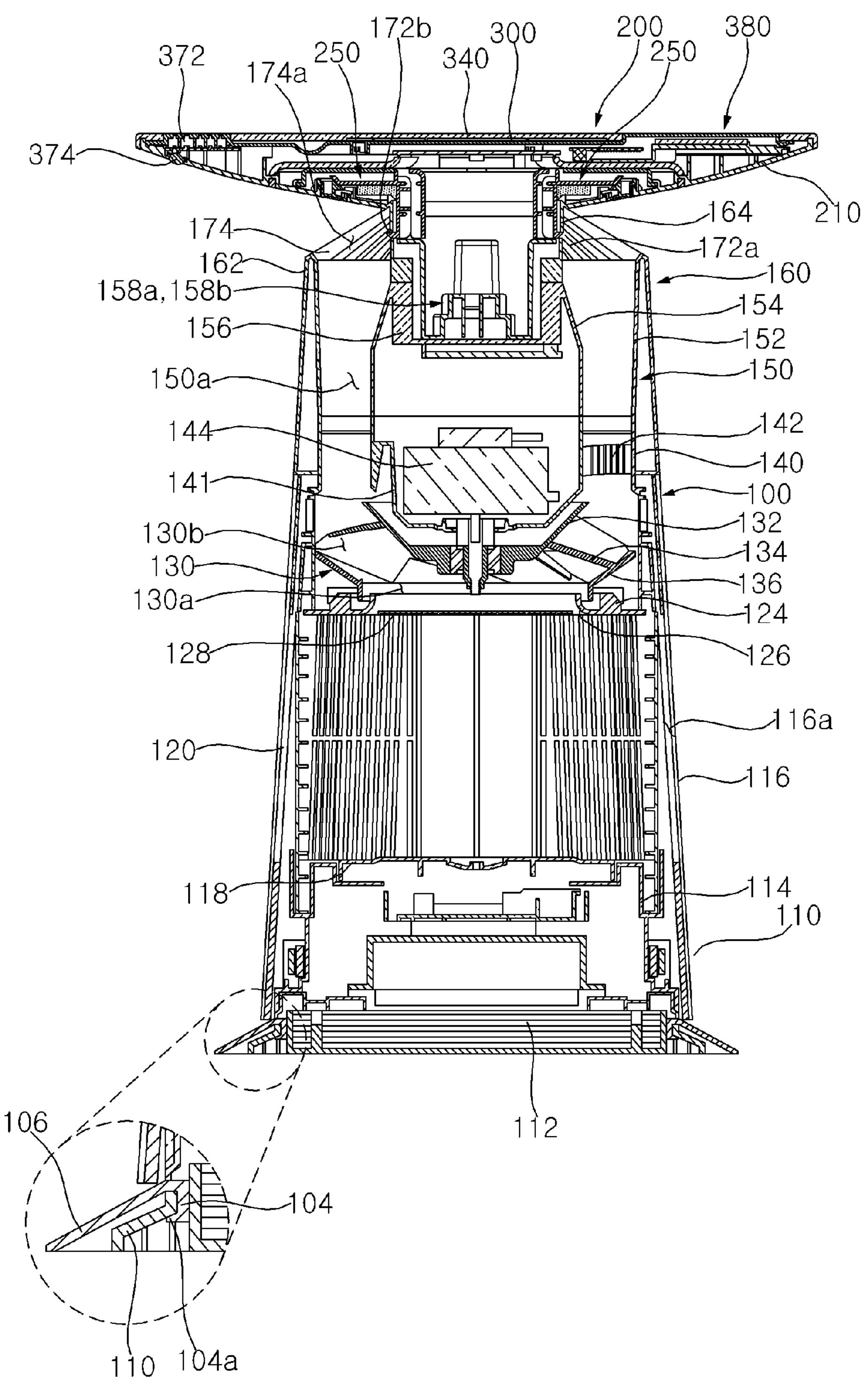
FIG. 33 is a sectional view of FIG. 32.

Referring to FIGS. 32 and 33, the base supporter 102 according to the second embodiment may have a bar-shaped structure separately mounted on the base 110.

A supporter groove 111 in which the base supporter 102 is mounted may be formed at the base 110.

Referring to FIG. 33, the supporter groove 111 in which one end portion of the base supporter 102 is mounted may be formed at the base 110.

Referring to FIG. 33, the base supporter 102 may include an insertion portion 104 that is inserted into the supporter groove 111 and an extension portion 106 extending in a radially outward direction (or outward direction) from an upper end of the insertion portion 104.

An engagement protrusion 104*a* that fixes the base supporter 102 to the supporter groove 111 may be formed at a lower end of the insertion portion 104. The engagement protrusion 104*a* may have a structure that protrudes in a radially outward direction from the lower end of the insertion portion 104.

The extension portion 106 may have a structure that is bent from an upper end of the insertion portion 104 and extends in a radially outward direction. The extension portion 106 may have a structure that extends downward as it goes away from the insertion portion 104. Therefore, an outer end of the extension portion 106 may have a structure that contacts the ground.

A objective may be to provide the filtered air quickly and widely to the indoor space and to provide an air cleaner capable of utilizing a space above the air cleaner.

Another objective may be to provide an air cleaner that can utilize a space above the air cleaner as the table.

Another objective may be to provide an air cleaner that can be separated and coupled in various ways, so that the user can use tables of various sizes according to the user's preferences.

Another objective may be to provide an air cleaner with a structure that prevents foreign substances falling from the table from interfering with operation of the air cleaner.

Another objective may be to provide an air cleaner that minimizes shape deformation caused by friction with objects placed on an upper side of the air cleaner.

Another objective may be to provide an air cleaner that increases flow rate of the filtered air.

Another objective may be to provide an air cleaner that prevents fluid flowing down from the top surface of the air cleaner, which is used as a table, from entering an inside where electronic units are placed. Another objective may be to provide an air cleaner that can facilitate to mount of an upper structure of the air cleaner easily and on the fixed position.

Another objective may be to provide an air cleaner that reliably send electrical signal or power to the upper structure mounted on an upper side of the air cleaner.

Another objective may be to provide an air cleaner that prevent the air cleaner being flipped.

To solve the objectives above, an air cleaner according to an embodiment may comprise a first body comprising an inlet formed at a peripheral surface thereof, and an outlet disposed above the inlet; a fan rotatably disposed between the inlet and the outlet to induce air flow from the inlet to the outlet; a filter removing foreign substance in air introduced through the inlet; and a second body disposed above the first body and guiding air discharged from the outlet in a radially outward direction, wherein a lower surface of the second body is disposed above the outlet and extends in the radially outward direction as it goes upward, and wherein an upper surface of the second body forms a flat surface in at least a part area. Therefore, it is possible to perform air cleaning by lower configurations and to use upper configurations as the table.

An area formed by the upper surface of the second body may be larger than an area formed by the outlet so that objects placed on an upper side of the table do not fall toward the outlet.

The second body may comprise a lower cover fixed to the first body and extending in the radially outward direction as it goes upward to guide air discharged from the outlet; and a top cover separably disposed on an upper side of the lower cover and forming the flat surface.

The top cover may be formed of an abrasion-resistant PC material so that the shape deformation caused by impact generated at an upper side of the top cover is minimized.

The lower cover may form a curved surface that an inclination angle of tangential line is getting larger as it goes upward.

The lower cover may be bowl-shaped to form a space that electronic units are disposed, and wherein the second body further comprises an upper cover disposed between the lower cover and the top cover to cover at least portion of an upper side of the lower cover so that upper side of the electronic units disposed inside the lower cover can be covered twice.

The upper cover may comprise a plate, and at least one protruding cover protruding upward from the plate, and wherein a hole corresponding to the protruding cover is formed at the top cover, so that it is possible to check mounting position when the top cover is mounted on an upper side of the upper cover.

A plurality of protruding covers having different shapes and spaced apart in a circumferential direction may be disposed at the upper cover, and wherein a plurality of holes corresponding to each of the plurality of protruding covers are formed at the top cover, so that it is possible to check mounting position when the top cover is mounted on an upper side of the upper cover.

The second body may further comprise a lamp disposed in the lower cover and displaying an operation state of the fan, and a charging unit supplying power to an electronic product disposed above the top cover by wireless charging and disposed in the lower cover, wherein a first protruding cover protruding upward to cover an upper side of the charging unit, and a second protruding cover protruding upward to cover an upper side of the lamp are disposed at the upper cover, and wherein a first hole corresponding to the first protruding cover, and a second hole corresponding to the second protruding cover are formed at the top cover, so that it is possible to check mounting position when the top cover is mounted on an upper side of the upper cover.

The lower cover may comprise a guide wall disposed above the outlet to guide air discharged from the outlet, and an insertion pole extending downward from a lower end portion of the guide wall, wherein the outlet is annular-shaped, and wherein a coupling groove is formed at the first body such that the insertion pole is inserted into the coupling groove at a center which inside of the annular outlet, so that the second body can be separated from the first body or can be coupled to the first body.

A first connection terminal supplying power to the second body and a second connection terminal transmitting signal to the second body may be disposed at a lower end portion of the coupling groove, and wherein a first corresponding terminal connected to the first connection terminal and a second corresponding terminal connected to the second connection terminal are disposed at a lower surface of the insertion pole, so that the first body and the second body can be electrically connected when the second body is mounted on the first body.

A plurality of guide ribs that have different shapes may be disposed at one of the coupling groove of the first body or a peripheral wall of the insertion pole, and wherein a plurality of guide grooves that the plurality of guide ribs are respectively inserted are disposed at the other of the coupling groove of the first body or a peripheral wall of the insertion pole, so that mounting the second body can be mounted on the first body at the same position.

The air cleaner may further comprise a base disposed below the first body and disposed to contact the ground, and wherein the base is shaped to expand in a radial direction as it goes downward from the first body, so that it is possible to maintain the position of the first body without being flipped.

A diameter of a lower end portion of the base may be larger than a diameter of the first body, so that it is possible to maintain the position of the first body without being flipped.

The air cleaner may further comprise a base disposed below the first body and disposed to contact the ground; and a base supporter comprising a first end portion fixed to the base and a second end portion disposed to contact the ground, so that it is possible to maintain the position of the first body without being flipped.

An air cleaner according to an embodiment of the present invention may comprise a first body comprising an inlet formed at a peripheral surface thereof, and an outlet disposed above the inlet; a fan rotatably disposed between the inlet and the outlet to induce air flow from the inlet to the outlet; a filter removing foreign substance in air introduced through the inlet; and a second body disposed above the first body and guiding air discharged from the outlet in a radially outward direction, wherein the second body comprises a lower cover comprising a guide wall that extends in the radially outward direction to guide air discharged from the outlet, and an insertion pole extending downward from a lower end portion of the guide wall; and a top cover disposed above the lower cover and forming a flat surface, wherein the outlet is annular-shaped, and wherein a coupling groove that the insertion pole is inserted is formed at the first body, the coupling groove radially inside of the annular outlet, so that the second body with a variety of sizes can be placed or replaced on the first body.

A first connection terminal supplying power to the second body and a second connection terminal transmitting signal to the second body may be disposed at the coupling groove, so that the second body can be electrically connected to the first body when the second body is mounted on the first body.

A plurality of guide ribs that have different shapes may be disposed at one of the coupling groove of the first body or a peripheral wall of the insertion pole.

The second body may comprise a coupling portion protruding toward an inner peripheral surface of the coupling groove to fix the second body when the second body is inserted into the coupling groove.

An air cleaner according to an embodiment may comprise a first body comprising an inlet formed at a peripheral surface thereof, an annular outlet disposed above the inlet, and a coupling groove disposed inside of the annular outlet and depressed downward; a fan rotatably disposed between the inlet and the outlet to induce air flow from the inlet to the outlet; a filter removing foreign substance in air introduced through the inlet; and a second body mounted on the coupling groove of the first body and electrically connected to the first body when the second body is mounted on the coupling groove, so that electricity can be supplied to the second body which is mounted on the first body.

The second body may comprise a coupling portion protruding toward an inner peripheral surface of the coupling groove to fix the second body when the second body is inserted into the coupling groove, so that the second body can which is mounted on the first body can be stably fixed thereto.

According to an air cleaner, following effects one or more.

First, it is possible to quickly diffuse the filtered air to the indoor space by disposing a second body above the air cleaner that discharges the filtered air upward and by guiding air discharged from the outlet in a radial direction. In addition, since the first body has a structure that the second body is coupled to an inside of the outlet, it is possible to utilize the space above the air cleaner.

Second, by placing the second body that guides air upwardly and functions as a table, it is possible to utilize the second body as a table. The advantage of this is to increase the space utilization by combining an air purifier with a table into a single device that is used in a space where the user may place objects or take a rest.

Third, since the second body is mounted on the first body, it is possible to change the table, mounted on the first body, with variety of structures or sizes. The advantage of this is to increase the space utilization by changing the size or shape of the table according to the user's preferences.

Fourth, since a size of an upper surface of the second body is larger than a size of the outlet, it is possible to prevent object or fluid on an upper side of the structure used as the table from falling to the outlet. The advantage of this is to prevent a breakdown of the air cleaner or safety accident.

Fifth, an upper surface of the second body and/or the top cover is made of material that is resistant to heat and abrasion, thereby minimizing deformation or abrasion of an upper surface of the second body caused by objects placed on the upper surface of the second body.

Sixth, since flowing direction of air which is discharged in a radial direction by an inclined shape of the lower surface of the second body prevents vortices, it is possible to increase flow rate of the filtered air and to quickly increase air quality of indoor space.

Seventh, since a state that the second body is mounted on an upper side of the first body is maintained, it is possible to stably separate the second body from the first body.

Eighth, when the second body is mounted on the first body, the first, second body are electrically connected. In addition, since terminals for connecting power and signal are connected at exact positions when the second body is mounted on the first body, there is advantage of stably performing electrical operations.

Ninth, there is a risk that the entire structure may be overturned by external pressure because an upper side of the air cleaner is relatively large. However, the air cleaner can be stably placed by the shape of a base disposed below the first body and by the structure of a base supporter placed around the base.

The effects of embodiments are not limited to the effects mentioned above, and other effects not mentioned would be clearly understood from the claims by those who skilled in the art.

Details of the embodiments and the like are included in the detailed description and drawings.

The objectives are not limited to the objectives mentioned above, and other objectives not mentioned would be clearly understood from the following description by those who skilled in the art.

Desirable embodiments are described and illustrated above, but embodiments are not limited to the specific embodiments disclosed above and can be variously modified within the scope of the claims without departing from the essence of the invention as understood by those skilled in the art to which the invention pertains. These modifications should not be understood beyond the technical scope or concepts of the invention as described or anticipated and should not be understood individually from the technical concepts and perspective of the invention.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air cleaner comprising:

a first body that includes an inlet at a peripheral surface of the first body, and an outlet upper end disposed above the inlet;

a fan disposed between the inlet and the upper end of the first body, and configured to induce air flow from the inlet to the upper end, where the air flows upwards in an annular shape;

a filter configured to remove foreign substance in air introduced through the inlet; and a second body disposed above the first body and configured to guide air discharged through the upper end in at least one of vertical direction or outward direction, wherein the second body includes a lower central portion configured for coupling to the first body and a lower outer portion surrounding the lower central portion and disposed above the upper end, and the lower outer portion of the second body includes a lower surface that extends in the outward direction as the lower surface rises vertically, wherein the lower surface forms a convex shape, wherein the upper end of the first body includes a central portion and an outer portion surrounding the central portion, wherein the central region of the upper end is configured to couple with the lower central portion of the second body, wherein the outer portion of the upper end includes a grille with grille openings to allow air flowing in the annular shape to escape vertically, wherein an inner edge of the outer portion adjacent to the central portion of the upper end is vertically positioned higher than a periphery of the outer portion, and wherein a vertical distance between the grille and the lower surface of the second body increases as the lower surface extends away from the lower central region.

2. The air cleaner of claim 1, wherein the second body includes an upper surface of a prescribed area, which is larger than an area of the upper end of the first body.

3. The air cleaner of claim 1, wherein the second body includes:

a lower cover providing the lower surface; and a top cover disposed on an upper side of the lower cover and configured to serve as a table to support at least one item thereon.

4. The air cleaner of claim 3, wherein the top cover is formed of an abrasion-resistant PC material.

5. The air cleaner of claim 3, wherein an inclination angle of a tangential line increases as the lower surface extends away from the lower central region.

6. The air cleaner of claim 3, wherein the lower cover is configured to form a space in which electronic units are disposed, and wherein the second body includes an upper cover disposed between the lower cover and the top cover, and the upper cover covers at least a portion of the lower cover.

7. The air cleaner of claim 6, wherein the upper cover includes a plate, and at least one protruding cover to protrude upward from the plate, and wherein the top cover includes a hole corresponding to the at least one protruding cover.

8. The air cleaner of claim 6, wherein the upper cover includes a plurality of protruding covers having different shapes and spaced apart in a circumferential direction, and wherein the top cover has a plurality of holes corresponding to each of the plurality of protruding covers.

9. The air cleaner of claim 6, wherein the second body includes:

a lamp disposed in the lower cover and configured to display an operation state of the fan; and a charging device disposed in the lower cover and configured to supply power to an electronic product disposed above the top cover, wherein the upper cover includes:

a first protruding cover that protrudes upward to cover an upper side of the charging device, and a second protruding cover that protrudes upward to cover an upper side of the lamp, and wherein the top cover includes a first hole corresponding to the first protruding cover, and a second hole corresponding to the second protruding cover.

10. The air cleaner of claim 1, wherein the lower cover includes a guide wall having the lower surface disposed above the outlet to guide air discharged through the grill, and an insertion pole at the lower central portion to extend downward from the guide wall, wherein the grill has an annular shape, and wherein a coupling groove is disposed at the central portion of the upper end to receive the insertion pole.

11. The air cleaner of claim 10, wherein the coupling groove includes a first connection terminal configured to provide power to the second body, and a second connection terminal configured to transmit a signal to the second body, and wherein a lower surface of the insertion pole includes a first pole terminal to connect to the first connection terminal, and a second pole terminal to connect to the second connection terminal.

12. The air cleaner of claim 11, wherein a plurality of guide ribs having different shapes are disposed at one of the coupling groove of the first body or a peripheral wall of the insertion pole, and wherein the plurality of guide ribs are to be respectively inserted into a plurality of guide groove disposed at the other one of the coupling groove or the peripheral wall.

13. The air cleaner of claim 1, comprising a base disposed below the first body and disposed to contact ground, and wherein the base is shaped to expand in a radial direction as the base goes downward from the first body.

14. The air cleaner of claim 13, wherein a diameter of a lower end of the base is larger than a diameter of the first body.

15. The air cleaner of claim 1, comprising:

a base disposed below the first body; and a base supporter that includes a first end to attach to the base and a second end disposed to contact the ground.

16. An air cleaner comprising:

a first body that includes an inlet at a peripheral surface of the first body and an upper end disposed above the inlet;

a fan disposed between the inlet and the upper end, and configured to induce air flow from the inlet to the upper end;

a filter configured to remove foreign substance in air introduced through the inlet; and a second body disposed above the first body and configured to guide air discharged through the upper end in at least one of vertical direction or outward direction; and a second body coupled to the first body and configured to guide air discharged through the upper end of the lower body, wherein a lower surface of the second body is disposed above the upper end of the first body, wherein the second body includes an upper surface having an oval shape, where a diameter in a first horizontal direction is different from a diameter in a second horizontal direction, and the upper surface being configured to serve as a surface for supporting at least one item place thereon, wherein the upper surface is elongated in a direction in which a charging pad of a charging device is disposed, wherein the air flows to the upper end of the first body in an annular shape, and the upper end includes a central portion configured to couple to the second body, and a grille of annular shape surrounding the central portion to exhaust the air, and wherein the second body includes a lower surface and an inner edge of grille adjacent to the center portion is position higher than a periphery of the grille such that a vertical distance between the grille and the lower surface is increased as the lower surface extends outwards in a horizontal direction.

17. The air cleaner of claim 16, where an area of the upper surface of the second body is greater than an area of the upper end of the lower body such that the upper end of the lower body is hidden underneath the second body when viewed vertically above the upper surface.

18. The air purifier of claim 16, wherein a lower central portion of the second body and a central portion of the upper end of the first body have complementary structures to couple the first and second body.

* * * * *